(12) United States Patent
Yamaguchi

(10) Patent No.: US 12,471,287 B2
(45) Date of Patent: Nov. 11, 2025

(54) SEMICONDUCTOR DEVICE AND METHOD OF MANUFACTURING THE SAME

(71) Applicant: RENESAS ELECTRONICS CORPORATION, Tokyo (JP)

(72) Inventor: Tadashi Yamaguchi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 752 days.

(21) Appl. No.: 17/847,991

(22) Filed: Jun. 23, 2022

(65) Prior Publication Data

US 2023/0066650 A1   Mar. 2, 2023

(30) Foreign Application Priority Data

Aug. 24, 2021   (JP) .................. 2021-136256

(51) Int. Cl.
*H10B 51/20* (2023.01)
*G11C 11/22* (2006.01)
*H10D 30/69* (2025.01)

(52) U.S. Cl.
CPC ............ *H10B 51/20* (2023.02); *G11C 11/223* (2013.01); *G11C 11/2275* (2013.01); *H10D 30/701* (2025.01)

(58) Field of Classification Search
CPC ... H10B 51/20; G11C 11/2275; G11C 11/223; H10D 30/701
See application file for complete search history.

(56) References Cited

U.S. PATENT DOCUMENTS

| 10,998,408 B2 | 5/2021 | Yamaguchi | |
| 2014/0120415 A1* | 5/2014 | Suguro | H01M 10/052 429/188 |
| 2021/0398990 A1* | 12/2021 | Chia | H10D 64/017 |

(Continued)

FOREIGN PATENT DOCUMENTS

| JP | H8-078549 A | 3/1996 |
| JP | 2004-119693 A | 4/2004 |

(Continued)

OTHER PUBLICATIONS

Notice of Reasons for Refusal dated Apr. 16, 2024 issued in the corresponding Japanese Patent Application No. 2021-136256, with English translation.

*Primary Examiner* — Jeff W Natalini
*Assistant Examiner* — Brandon C Fox
(74) *Attorney, Agent, or Firm* — Rimon P.C.

(57) ABSTRACT

A performance of a memory cell including a ferroelectric film is improved. Reliability of the memory cell is ensured. A semiconductor device having a memory cell includes: a plurality of semiconductor layers configuring a channel region; a pair of semiconductor layers SI2 provided so as to sandwich the plurality of semiconductor layers SI1 in an X direction, connected to the plurality of semiconductor layers SI1, and configuring a source region and a drain region; a plurality of paraelectric films IL covering outer peripheries of the plurality of semiconductor layers SI1, respectively; a bottom electrode BE covering outer peripheries of the plurality of paraelectric films IL between the pair of semiconductor layers SI2; a ferroelectric film FE formed on the bottom electrode BE; and a top electrode TE formed on the ferroelectric film FE.

20 Claims, 22 Drawing Sheets

(56) References Cited

U.S. PATENT DOCUMENTS

| | | | | |
|---|---|---|---|---|
| 2022/0310654 A1* | 9/2022 | Choi | ................. | H10D 62/121 |
| 2022/0399351 A1* | 12/2022 | Yu | ................. | H10D 64/689 |
| 2023/0041159 A1* | 2/2023 | Zhang | ................. | H10D 64/017 |
| 2023/0378335 A1* | 11/2023 | Lim | ................. | H01L 21/02603 |

FOREIGN PATENT DOCUMENTS

| | | |
|---|---|---|
| JP | 2019-201172 A | 11/2019 |
| JP | 2021-520628 A | 8/2021 |
| WO | 2019/195025 A1 | 10/2019 |

\* cited by examiner

CROSS SECTION B-B

CROSS SECTION D-D

CROSS SECTION E-E

SEMICONDUCTOR DEVICE AND METHOD OF MANUFACTURING THE SAME

CROSS-REFERENCE TO RELATED APPLICATION

The present application claims priority from Japanese Patent Application No. 2021-136256 filed on Aug. 24, 2021, the content of which is hereby incorporated by reference into this application.

BACKGROUND

The present invention relates to a semiconductor device and a method of manufacturing the same, and more particularly, to a semiconductor device having a memory cell including a ferroelectric film and a method of manufacturing the same.

There are disclosed techniques listed below.
[Patent Document 1] Japanese Unexamined Patent Application Publication No. 2019-201172

In recent years, a nonvolatile memory cell using a ferroelectric film such as a HfZrO film (commonly referred to as an HZO film) has been developed. As a structure of such a memory cell, a Metal Ferroelectric Insulator Semiconductor-Field Effect Transistor (MFIS-FET) structure in which an HZO film is formed on a gate insulating film of a Metal Insulator Semiconductor-FET (MIS-FET), a Metal Ferroelectric Metal Insulator Semiconductor-FET (MFMIS-FET) structure in which an electrode is formed between the gate insulating film and the HZO film, and the like have been proposed. For example, Japanese Unexamined Patent Application Publication No. 2019-201172 (Patent Document 1) discloses a memory cell having the MFIS-FET structure.

SUMMARY

Each of FIGS. 22 to 25 shows a memory cell having an MFMIS-FET structure studied by the inventors of the present application, and is a memory cell in a study example. Note that FIG. 23 is a cross-sectional view taken along a line D-D in FIG. 22, FIG. 24 is a cross-sectional view taken along a line E-E in FIG. 22, and FIG. 25 is an equivalent circuit diagram of the memory cell.

Such a memory cell is manufactured as follows: First, a paraelectric film IL, a bottom electrode BE, an amorphous HZO film, and a top electrode TE are sequentially deposited on a semiconductor substrate SUB separated by an element isolation portion STI. Next, the amorphous HZO film is subjected to a heat treatment at 600 to 800° C. to form an orthorhombic HZO film. Since the orthorhombic HZO film has ferroelectricity, the orthorhombic HZO film can be used as a ferroelectric film FE.

Next, the paraelectric film IL, the bottom electrode BE, the amorphous HZO film, and the top electrode TE are patterned using a mask pattern such as a polycrystalline silicon film. This patterning determines an area of each of the paraelectric film IL and the bottom electrode BE.

Next, the ferroelectric film FE and the top electrode TE are patterned using a mask pattern such as a polycrystalline silicon film. This patterning determines an area of each of the ferroelectric film FE and the top electrode TE. That is, the area of each of the paraelectric film IL and the bottom electrode BE is larger than the area of each of the ferroelectric film FE and the top electrode TE.

Then, an impurity is introduced into the semiconductor substrate SUB through ion implantation to form a source region SR and a drain DR. Thus, the memory cell having the MFMIS-FET structure is manufactured.

During a write operation and an erase operation for the memory cell, a gate voltage Vg is applied to the top electrode TE, a source voltage Vs is applied to the source region, and a drain voltage Vd is applied to the drain region. In a case where the memory cell is an n-type FET, when a positive bias is applied to the top electrode TE, polarization in the ferroelectric film FE becomes downward, and a threshold voltage drops down. On the other hand, when a negative bias is applied to the top electrode TE, the polarization in the ferroelectric film FE becomes upward, and the threshold voltage rises up.

As illustrated in FIG. 25, during the write operation and the erase operation for the memory cell, the gate voltage Vg is applied to the top electrode TE while the gate voltage Vg is divided into a gate voltage Vg_FE and a gate voltage Vg_IL in the ferroelectric film FE and the paraelectric film IL, respectively. To apply a higher voltage to the ferroelectric film FE, it is effective to relatively decrease the capacitance of the ferroelectric film FE and relatively increase the capacitance of the paraelectric film IL. As one method for achieving it, changing the area ratio of the top electrode TE to the bottom electrode BE is effective. In the above-described memory cell, it is effective to decrease the area of each of the ferroelectric film FE and the top electrode TE and to increase the area of each of the paraelectric film IL and the bottom electrode BE. In other words, it is effective to decrease the contact area between the ferroelectric film FE and the bottom electrode BE and to increase the contact area between the paraelectric film IL and the bottom electrode BE.

However, when the area of the bottom electrode BE is set to the minimum machining dimension, the area of the top electrode TE cannot be made smaller than the area of the bottom electrode BE. On the other hand, when the area of the top electrode TE is set to the minimum machining dimension, the area of the bottom electrode BE becomes large, and therefore, the planar size of the memory cell becomes large, and the microfabrication of the memory cell is limited. Therefore, the memory cell of FIGS. 22 to 25 has an issue that is inability of such free design of the area ratio among the electrodes as achieving the relatively small capacitance of the ferroelectric film FE and the relatively large capacitance of the paraelectric film IL.

In addition, to manufacture the electrode structure having different area ratios as in the memory cell of FIGS. 22 to 25, the ferroelectric film FE has to be exposed to plasma during dry etching processing. That is, there is also an issue that is damage of the plasma on the orthorhombic HZO film to cause reduction in the reliability of the memory cell.

A main object of the present application is to improve the performance of the memory cell by making the capacitance of the ferroelectric film FE relatively small and making the capacitance of the paraelectric film IL relatively large without the limitation of the microfabrication of the memory cell. In addition, another object of the present application is to ensure the reliability of the memory cell by preventing the ferroelectric film FE from being exposed to the plasma during the manufacturing process.

Other issues and novel characteristics will become apparent from the description of the present specification and the accompanying drawings.

A semiconductor device having a nonvolatile memory cell according to an embodiment includes: a plurality of first semiconductor layers each extending in a first direction and each configuring a channel region of the nonvolatile memory cell; a pair of second semiconductor layers provided so as to sandwich the plurality of first semiconductor layers in the first direction, connected to the plurality of first semiconductor layers, and configuring a source region and a drain region of the nonvolatile memory cell; a plurality of paraelectric films covering outer peripheries of the plurality of first semiconductor layers between the pair of second semiconductor layers, respectively; a bottom electrode covering outer peripheries of the plurality of paraelectric films between the pair of second semiconductor layers; a ferroelectric film formed on the bottom electrode; and a top electrode formed on the ferroelectric film.

A method of manufacturing a semiconductor device having a nonvolatile memory cell according to an embodiment includes a step (a) of forming a stacked body including a plurality of dummy layers and a plurality of first semiconductor layers by stacking the dummy layers extending in a first direction and the first semiconductor layers extending in the first direction alternately in a second direction intersecting the first direction; a step (b) of forming a dummy pattern covering a part of the stacked body after the step (a); a step (c) of forming a pair of sidewall spacers covering a part of the stacked body exposed from the dummy pattern so as to sandwich the dummy pattern in the first direction after the step (b); a step (d) of removing the plurality of dummy layers and the plurality of first semiconductor layers exposed from the dummy pattern and the pair of sidewall spacers after the step (c); a step (e) of removing the plurality of dummy layers after the step (d); a step (f) of embedding a plurality of first insulating films in a space where the plurality of dummy layers were present after the step (e); a step (g) of forming a pair of second semiconductor layers connected to the plurality of first semiconductor layers so as to sandwich the plurality of first semiconductor layers and the pair of sidewall spacers in the first direction after the step (f); a step (h) of exposing the plurality of first semiconductor layers by removing the dummy pattern and the plurality of first insulating films covered with the dummy pattern between the pair of sidewall spacers after the step (g); a step (i) of forming a plurality of paraelectric films on outer peripheries of the plurality of first semiconductor layers after the step (h); a step (j) of forming a bottom electrode on outer peripheries of the plurality of paraelectric films after the step (i); a step (k) of forming an amorphous film on the bottom electrode after the step (j); a step (1) of forming a top electrode on the amorphous film after the step (k); and a step (m) of forming a ferroelectric film by subjecting the amorphous film to a heat treatment after the step (1). Here, the plurality of first semiconductor layers each configures a channel region of the nonvolatile memory cell, and the pair of second semiconductor layers configure a source region and a drain region of the nonvolatile memory cell.

According to an embodiment, the performance of the memory cell including the ferroelectric film can be improved. Further, the reliability of the memory cell can be ensured.

BRIEF DESCRIPTIONS OF THE DRAWINGS

DETAILED DESCRIPTION

Hereinafter, embodiments will be described in detail with reference to the drawings. Note that components having the same function are denoted by the same reference signs throughout all the drawings for describing the embodiments, and the repetitive description thereof will be omitted. In addition, the description of the same or similar portions is not repeated in principle unless particularly required in the following embodiments.

The X direction, the Y direction, and the Z direction described in the present application intersect and are orthogonal to one another. The expression "plan view" described in the present application means that a surface configured by the X direction and the Y direction is viewed from the Z direction. In addition, an expression such as "1 to 3 nm" for a numerical range described in the present application means "equal to or larger than 1 nm equal to or smaller than 3 nm."

First Embodiment

Configuration of Memory Cell of Semiconductor Device

Figure 1:
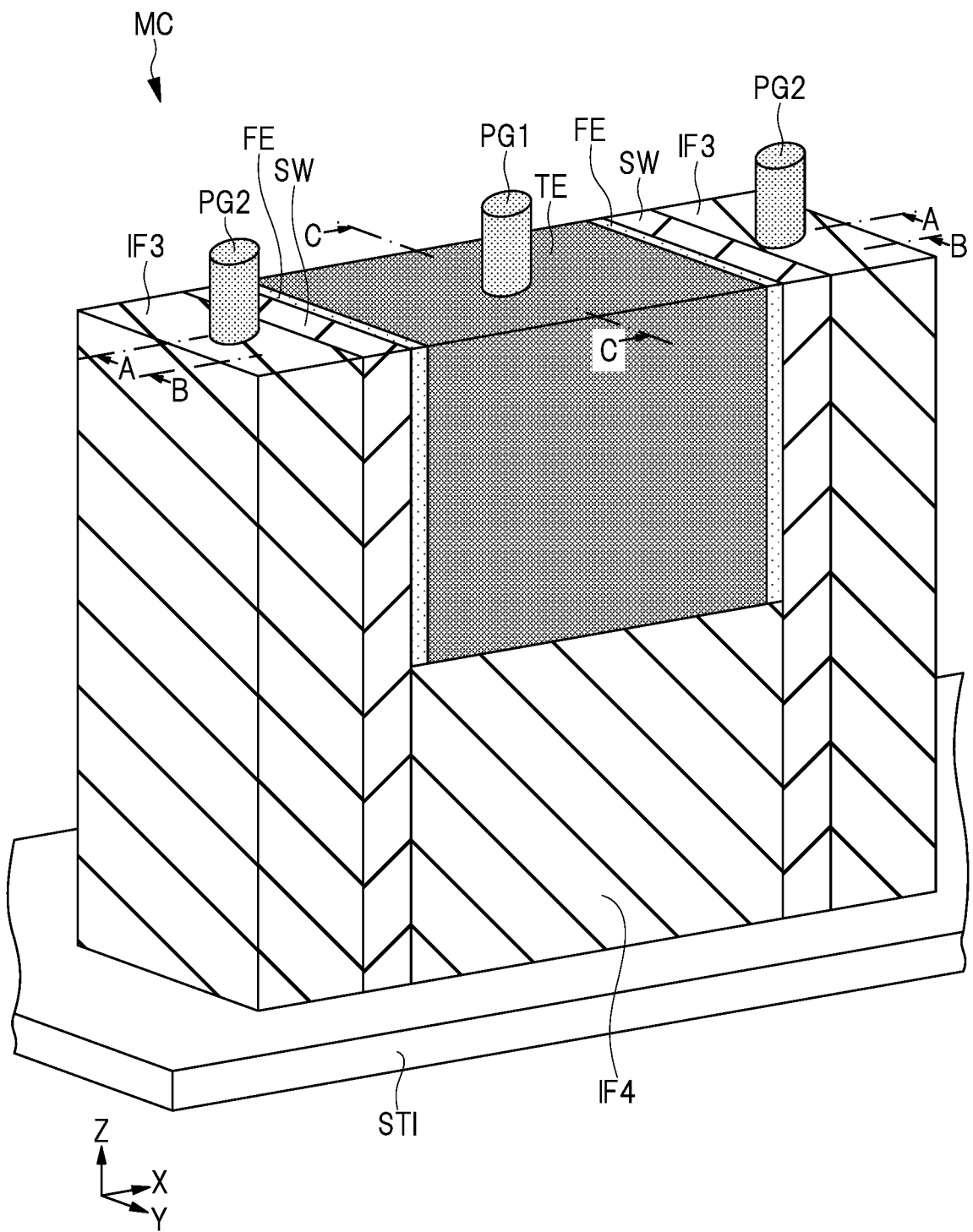
FIG. 1 is a perspective view illustrating a semiconductor device including a memory cell according to a first embodiment.
Figure 2:
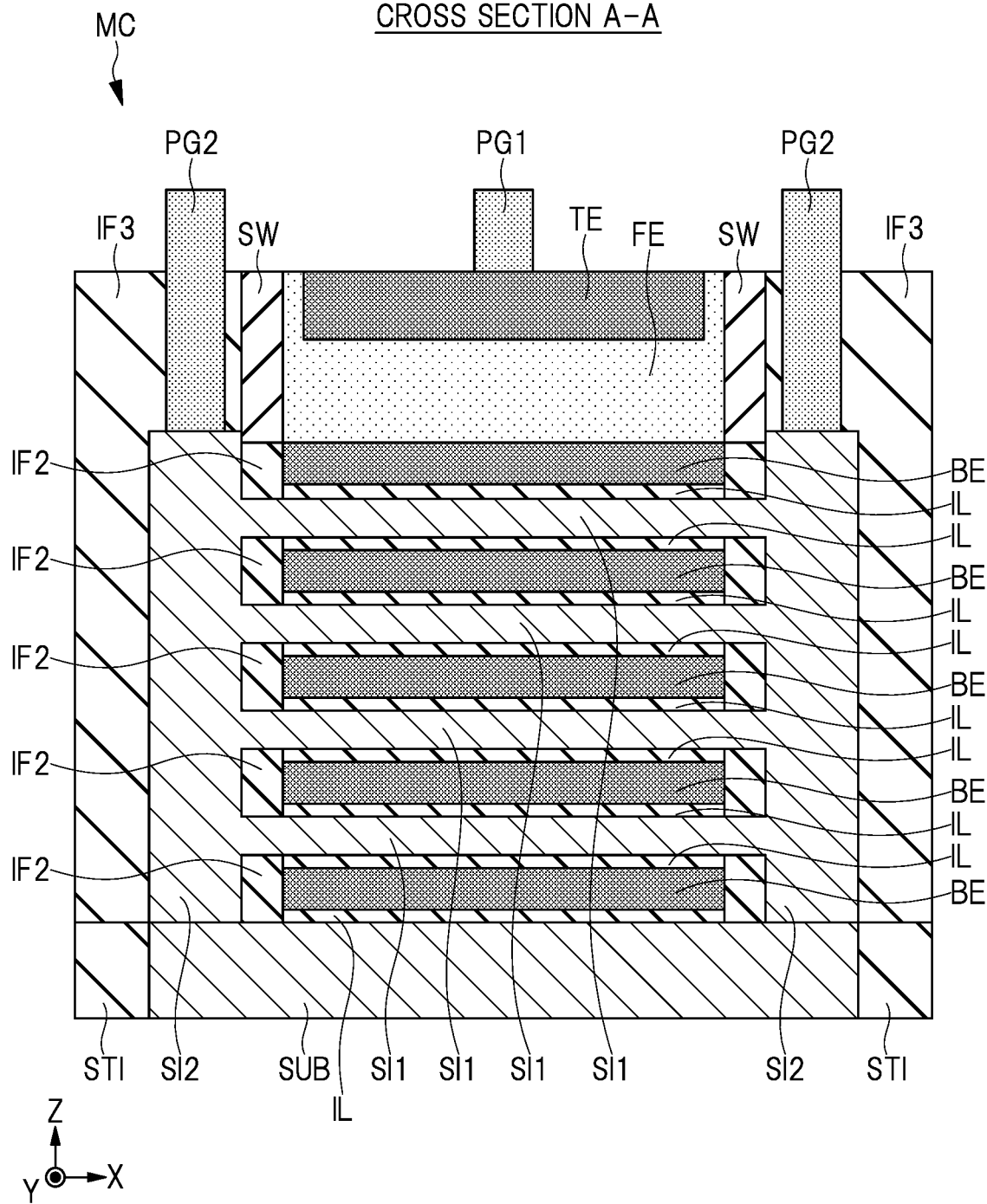
FIG. 2 is a cross-sectional view illustrating the semiconductor device including the memory cell according to the first embodiment.
Figure 3:
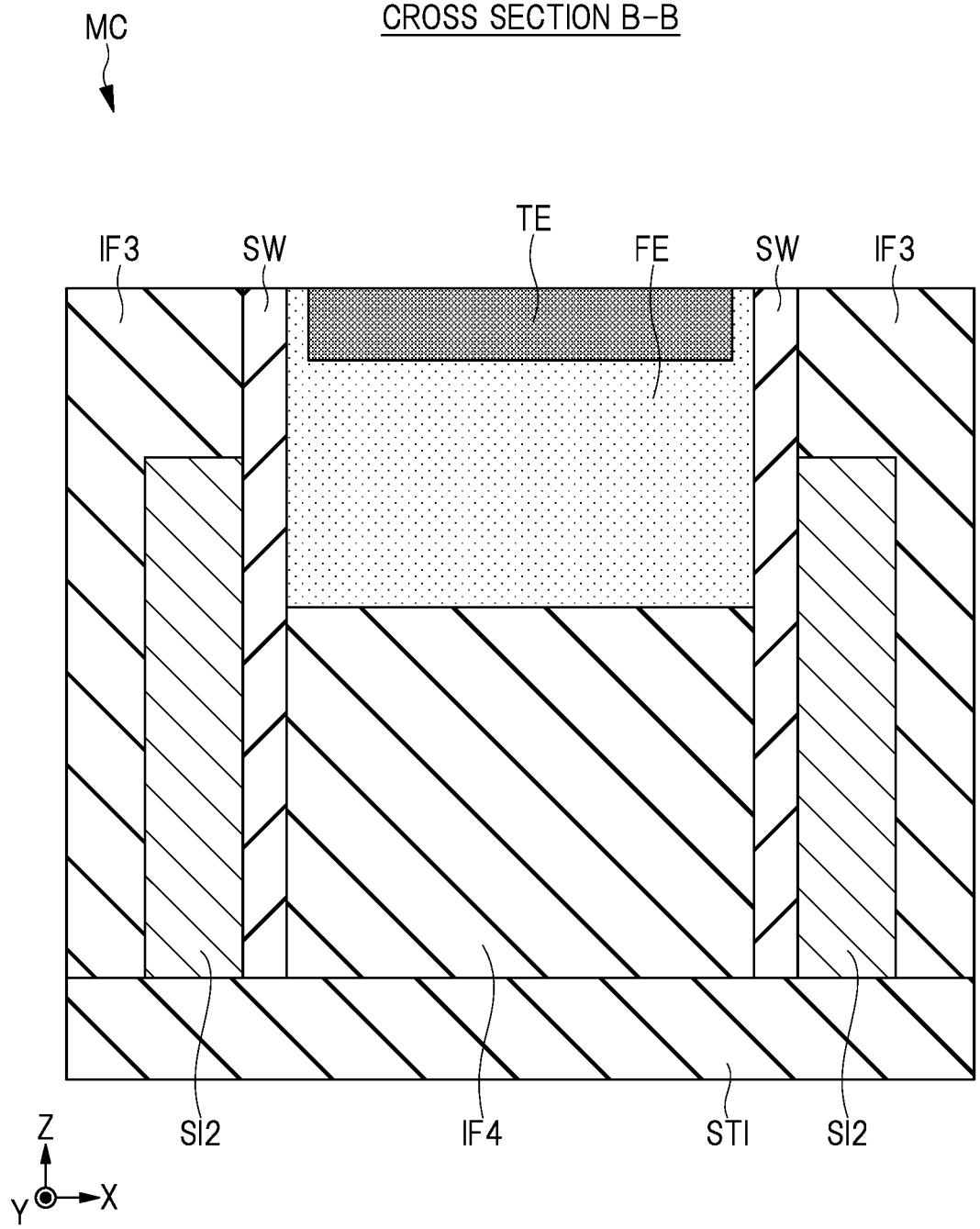
FIG. 3 is a cross-sectional view illustrating the semiconductor device including the memory cell according to the first embodiment.
Figure 4:
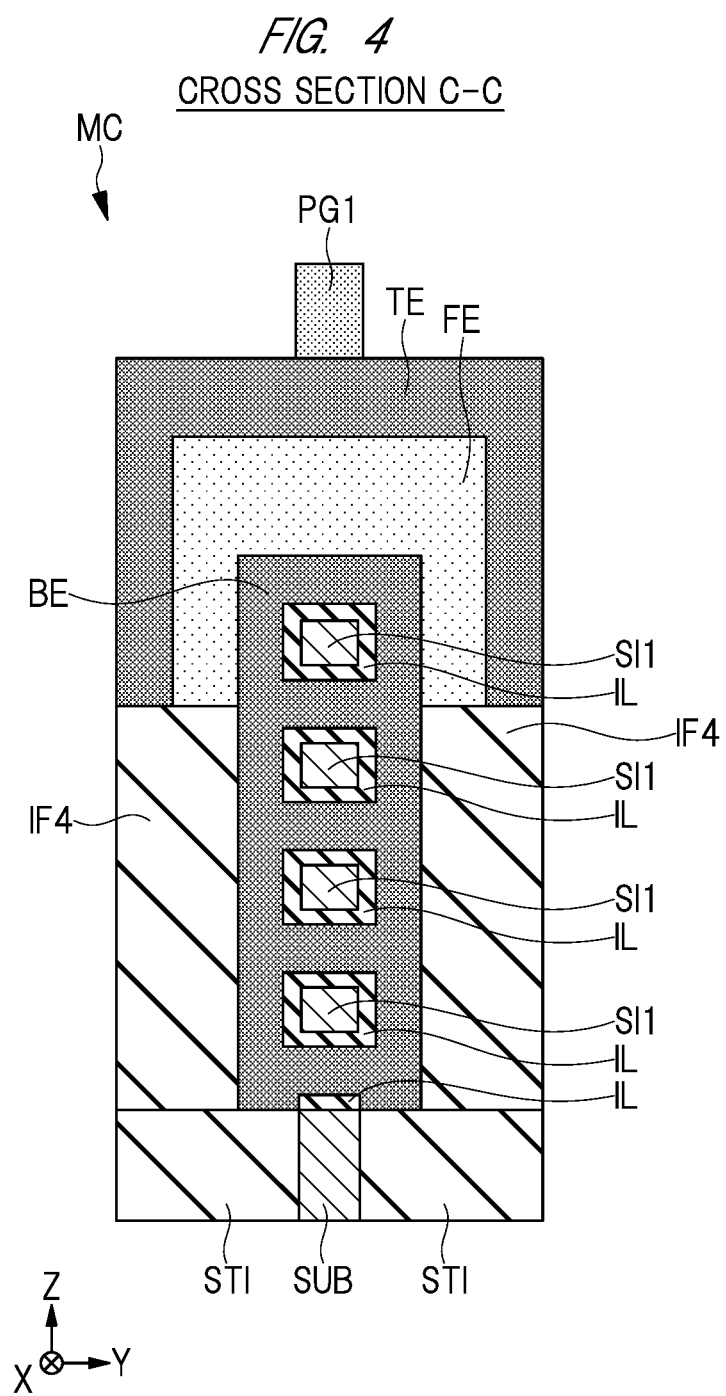
FIG. 4 is a cross-sectional view illustrating the semiconductor device including the memory cell according to the first embodiment.

An outline of a semiconductor device according to a first embodiment will be described below with reference to FIGS. 1 to 4. FIG. 2 is a cross-sectional view taken along a line A-A of FIG. 1, FIG. 3 is a cross-sectional view taken along a line B-B of FIG. 1, and FIG. 4 is a cross-sectional view taken along a line C-C of FIG. 1.

The semiconductor device is, for example, a semiconductor chip, and includes a plurality of memory cells MC, a CPU, a RAM, an analog circuit, an I/O circuit and others. The memory cell MC is a nonvolatile memory cell including a ferroelectric film FE, and is a memory cell having an MFMIS-FET structure.

A semiconductor substrate (semiconductor wafer) SUB is made of p-type monocrystalline silicon (Si) having a specific resistance of, for example, about 1 to 10 Ωcm. An element isolation portion STI is formed in the semiconductor substrate SUB. The element isolation portion STI is made of a trench formed in the semiconductor substrate SUB and an insulating film such as a silicon oxide film embedded in the trench. The memory cell MC is formed on the semiconductor substrate SUB and the element isolation portion STI.

As illustrated in FIGS. 1 to 4, the memory cell MC includes all or some of a plurality of semiconductor layers SI1, a pair of semiconductor layers SI2, a plurality of paraelectric films IL, a ferroelectric film FE, a bottom electrode BE, a top electrode TE, a pair of sidewall spacers SW, conductive layers PG1 to PG3, and insulating films IF2 to IF4.

The plurality of semiconductor layers SI1 each extends in the X direction and configures a channel region of the memory cell MC. Each of the plurality of semiconductor layers SI1 is made of silicon (Si). The thickness of each of the plurality of semiconductor layers SI1 is, for example, 5 to 30 nm. The plurality of semiconductor layers SI1 are provided adjacent to one another so as to be separated from one another in the Z direction. Here, a case where the number of the plurality of semiconductor layers SI1 is four is exemplified. However, the number of the plurality of semiconductor layers SI1 may be appropriately variable.

The pair of semiconductor layers SI2 is provided so as to sandwich the plurality of semiconductor layers SI1 in the X direction, is connected to the plurality of semiconductor layers SI1, and configures the source region and the drain region of the memory cell MC. Each of the pair of semiconductor layers SI2 is made of silicon (Si), and is unified with the plurality of semiconductor layers SI1. Here, a case where the memory cell MC is of an n-type is exemplified. Therefore, an impurity exhibiting an n-type conductivity such as arsenic (As) or phosphorus (P) is introduced into the pair of semiconductor layers SI2.

Each of the plurality of paraelectric films IL covers the outer periphery of each of the plurality of semiconductor layers SI1 between the pair of semiconductor layers SI2. In other words, each of the plurality of paraelectric films IL is formed on the upper surface, the lower surface, and both side surfaces of each of the plurality of semiconductor layers SI1. In addition, each of the plurality of paraelectric films IL is a silicon oxide film ($SiO_2$ film), a silicon oxynitride film (SiON film), or a monoclinic hafnium oxide film ($HfO_2$ film). The thickness of each of the plurality of paraelectric films IL is, for example, 1 to 3 nm.

The bottom electrode BE covers the outer peripheries of the plurality of paraelectric films IL between the pair of semiconductor layers SI2. The bottom electrode BE is provided so as to fill the space between the plurality of semiconductor layers SI1 via the plurality of paraelectric films IL. For example, in the Z direction, two paraelectric films IL and the bottom electrode BE are provided between two adjacent semiconductor layers SI1. In addition, the bottom electrode BE is made of a metal material such as titanium nitride (TiN).

The ferroelectric film FE is formed on the bottom electrode BE. In addition, the ferroelectric film FE is also formed on side surfaces of a part of the bottom electrode BE in the Y direction as illustrated in FIG. 4, and is also formed on side surfaces of the sidewall spacer SW in the X direction as illustrated in FIGS. 2 and 3. The ferroelectric film FE is an orthorhombic $HfO_2$ film or an orthorhombic $HfO_2$ film to which at least one of zirconium (Zr), silicon (Si), nitrogen (N), carbon (C), and aluminium (Al) is added.

The top electrode TE is formed on the ferroelectric film FE. As illustrated in FIG. 4, the top electrode TE is also formed on the side surfaces of the ferroelectric film FE in the Y direction. In addition, the top electrode TE is made of a metal material such as titanium nitride (TiN). Note that the plurality of semiconductor layers SI1/pair of semiconductor layers SI2, the bottom electrode BE, and the top electrode TE are electrically insulated from one another.

Near the end of the semiconductor layer SI, each of the plurality of insulating films IF2 is formed on the upper and lower surfaces of the semiconductor layer SI1. That is, near the end of the semiconductor layer SI1, the insulating film IF2 and the semiconductor layer SI1 are alternately stacked in the Z direction. The insulating film IF2 is, for example, a silicon oxide film ($SiO_2$ film).

A pair of sidewall spacers SW is provided so as to sandwich the ferroelectric film FE and the top electrode TE in the X direction. Near the end of the semiconductor layer SI1, the sidewall spacer SW is also provided around the plurality of insulating films IF2 and the plurality of semiconductor layers SI1 although not visibly recognized. The plurality of insulating films IF2 and the plurality of semiconductor layers SI1 are exposed from the sidewall spacer SW in the X direction and are in contact with the pair of semiconductor layers SI2. The sidewall spacer SW is made of an insulating film such as a silicon nitride film (SiN film).

The pair of insulating films IF3 is provided so as to sandwich the sidewall spacer SW in the X direction, and covers the pair of semiconductor layers SI2 to prevent the pair of semiconductor layers SI2 from being exposed out. The insulating film IF3 is, for example, a silicon oxide film ($SiO_2$ film).

The pair of insulating films IF4 is provided so as to sandwich the bottom electrode BE in the Y direction. The upper surface of the insulating film IF4 is located at a position lower than the upper surface of the bottom electrode BE, and the upper portion of the bottom electrode BE is exposed from the insulating film IF4. The ferroelectric film FE and the top electrode TE covering the side surfaces of the bottom electrode BE are provided on the insulating film IF4. The insulating film IF4 is, for example, a silicon oxide film ($SiO_2$ film).

Although not illustrated, the memory cell MC is covered with an interlayer insulating film. In the interlayer insulating film, a conductive layer (plug) PG1 and two conductive layers (plugs) PG2 are provided. The conductive layer PG1 and the two conductive layers PG2 are made of a laminated film of a barrier metal film such as a titanium nitride film and a tungsten film.

The conductive layer PG1 is provided to apply a gate voltage to the top electrode TE. The conductive layer PG1 is formed on the top electrode TE and is electrically connected to the top electrode TE. The two conductive layers PG2 are provided to apply a source voltage or a drain voltage to the pair of semiconductor layers SI2. The two conductive layers PG2 are formed on the pair of semiconductor layers SI2 so as to penetrate the insulating film IF3, and are electrically connected to the pair of semiconductor layers SI2.

Rewrite Operation of Memory Cell Mc

Figure 25:
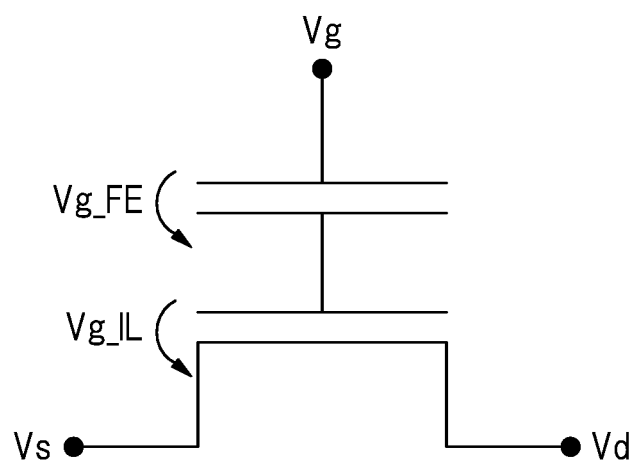
FIG. 25 is an equivalent circuit diagram illustrating the memory cell in the study example.

Hereinafter, the write operation, the erase operation, and the read operation for the memory cell MC will be described. The equivalent circuit of the memory cell MC is similar to that in FIG. 25 used in the study example.

Here, a case where the polarization state of the ferroelectric film FE is the first polarization state (upward state) is defined as a "write state." In addition, a case where the polarization state of the ferroelectric film FE is the second polarization state (downward state) different from the first polarization state is defined and explained as an "erase state." It is assumed that the threshold voltage of the memory cell MC in the write state is larger than the threshold voltage of the memory cell MC in the erase state.

In the write operation, a gate voltage having a negative voltage is applied to the top electrode TE, and a source voltage or a drain voltage having the same value is applied to the pair of semiconductor layers SI2. For example, a gate voltage of −3 V is applied to the top electrode TE, a source voltage of 0 V is applied to one semiconductor layer SI2, and a drain voltage of 0 V is applied to the other semiconductor layer SI2. No voltage is applied to the bottom electrode BE. That is, the bottom electrode BE is in a floating state. As a result, the polarization state of the ferroelectric film FE becomes the first polarization state. That is, the memory cell MC becomes in the write state.

In the erase operation, a gate voltage having a positive voltage is applied to the top electrode TE, and a source voltage or a drain voltage having the same value is applied to the pair of semiconductor layers SI2. For example, a gate voltage of 3 V is applied to the top electrode TE, a source voltage of 0 V is applied to one semiconductor layer SI2, and a drain voltage of 0 V is applied to the other semiconductor layer SI2. The bottom electrode BE is in the floating state. As a result, the polarization state of the ferroelectric film FE becomes the second polarization state. That is, the memory cell MC becomes in the erase state.

In the read operation, a gate voltage having a predetermined value is applied to the top electrode TE, and a source voltage or a drain voltage having a different value is applied to the pair of semiconductor layers SI2. For example, a gate voltage of 0 V is applied to the top electrode TE, a source voltage of 1 V is applied to one semiconductor layer SI2, and a drain voltage of 0 V is applied to the other semiconductor layer SI2. The bottom electrode BE is in the floating state.

The voltage applied to the top electrode TE during the read operation is set to be larger than the threshold voltage of the memory cell MC in the erase state and smaller than the threshold voltage of the memory cell MC in the write state. As a result, no current flows in the memory cell MC in the write state, and a current flows in the memory cell MC in the erase state. In this manner, the state of the memory cell MC is read based on the magnitude of the current value flowing in the memory cell MC.

Main Effects of First Embodiment

As described above, the gate voltage Vg is divided into the gate voltage Vg_FE and the gate voltage Vg_IL in the ferroelectric film FE and the paraelectric film IL, respectively. Therefore, in order to apply a higher voltage to the ferroelectric film FE, it is effective to relatively decrease the capacitance of the ferroelectric film FE and relatively increase the capacitance of the paraelectric film IL. In other words, it is effective to decrease the contact area between the ferroelectric film FE and the bottom electrode BE and to increase the contact area between the paraelectric film IL and the bottom electrode BE.

Hereinafter, the contact area between the plurality of paraelectric films IL and the bottom electrode BE will be described with reference to FIG. 5, and the contact area between the ferroelectric film FE and the bottom electrode BE will be described with reference to FIG. 6.

Figure 5:
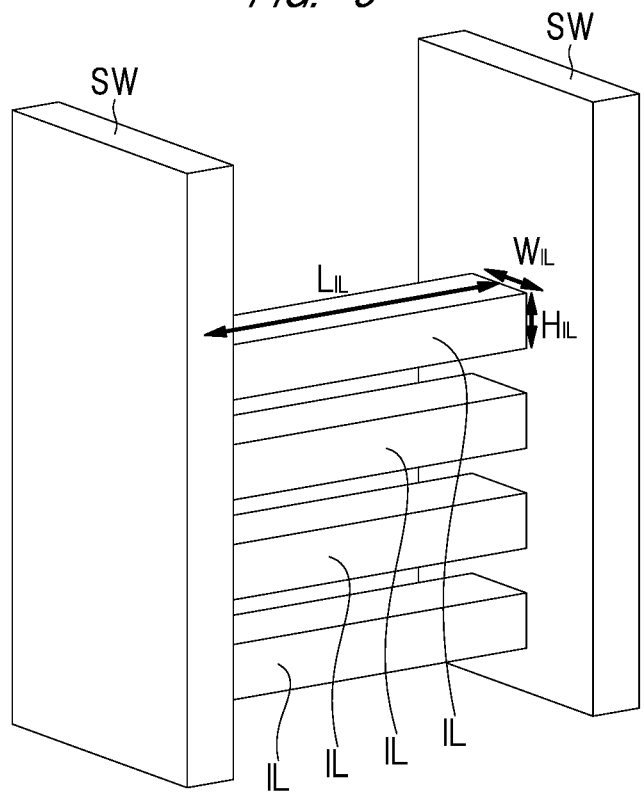
FIG. 5 is a perspective view illustrating dimensions of a part of the memory cell according to the first embodiment.
Figure 6:
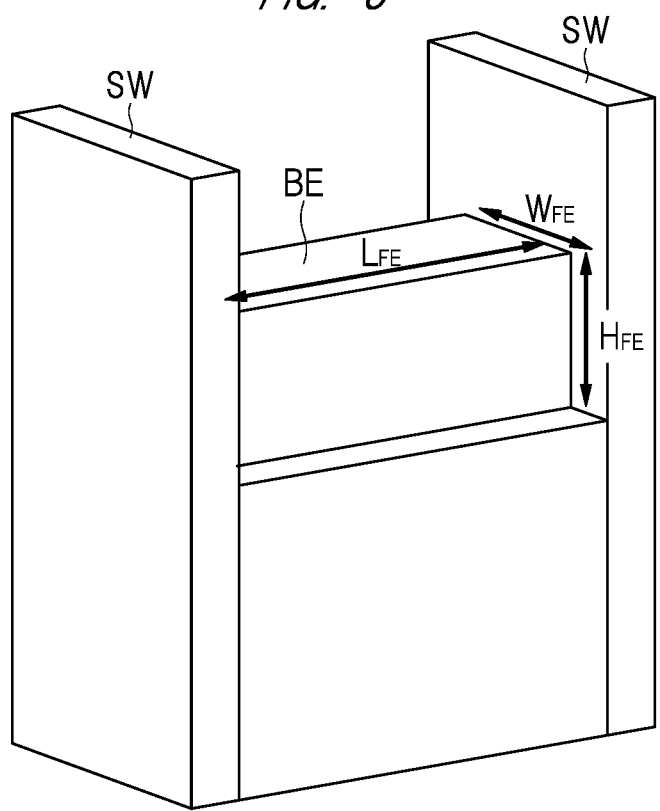
FIG. 6 is a perspective view illustrating dimensions of a part of the memory cell according to the first embodiment.

As shown in FIG. 5, the contact area between the plurality of paraelectric films IL and the bottom electrode BE is obtained by the following formula 1. Note that "n" is the number of the plurality of semiconductor layers SI1. In addition, as shown in FIG. 6, the contact area between the ferroelectric film FE and the bottom electrode BE is obtained by the following formula 2.

$$(2 \times L_{IL} W_{IL} + 2 \times L_{IL} H_{IL}) \times n \quad \text{(Formula 1)}$$

$$L_{FE} W_{FE} + 2 \times L_{FE} H_{FE} \quad \text{(Formula 2)}$$

In the memory cell MC according to the first embodiment, a plurality of semiconductor layers SI1 serving as a channel region are provided and stacked in the Z direction. Therefore, by adjusting the number of the plurality of semiconductor layers SI1, the contact area between the bottom electrode BE and the plurality of paraelectric films IL covering the outer peripheries of the plurality of semiconductor layers SI1 can be freely designed. That is, as the number of the plurality of semiconductor layers SI1 increases, the contact area between the plurality of paraelectric films IL and the bottom electrode BE can increase without increasing the planar size of the memory cell MC.

On the other hand, the contact area between the ferroelectric film FE and the bottom electrode BE can be freely designed by appropriately changing the dimensions $L_{FE}$, $W_{FE}$, and $H_{FE}$ of the bottom electrode BE. Particularly, the dimension $H_{FE}$ can be easily decreased since the position of the upper surface of the insulating film IF4 and the position of the upper surface of the bottom electrode BE can be adjusted by adjusting the etching amount for retracting the insulating film IF4. In this manner, the contact area between the ferroelectric film FE and the bottom electrode BE can be decreased.

As described above, according to the first embodiment, it is possible to make the contact area between the ferroelectric film FE and the bottom electrode BE smaller than the contact area between the plurality of paraelectric films IL and the bottom electrode BE. Therefore, the performance of the memory cell MC can be improved to prevent the microfabrication of the memory cell MC from being limited.

Method of Manufacturing Semiconductor Device

A method of manufacturing the semiconductor device according to the first embodiment will be described below with reference to FIGS. 7 to 19.

Figure 7:
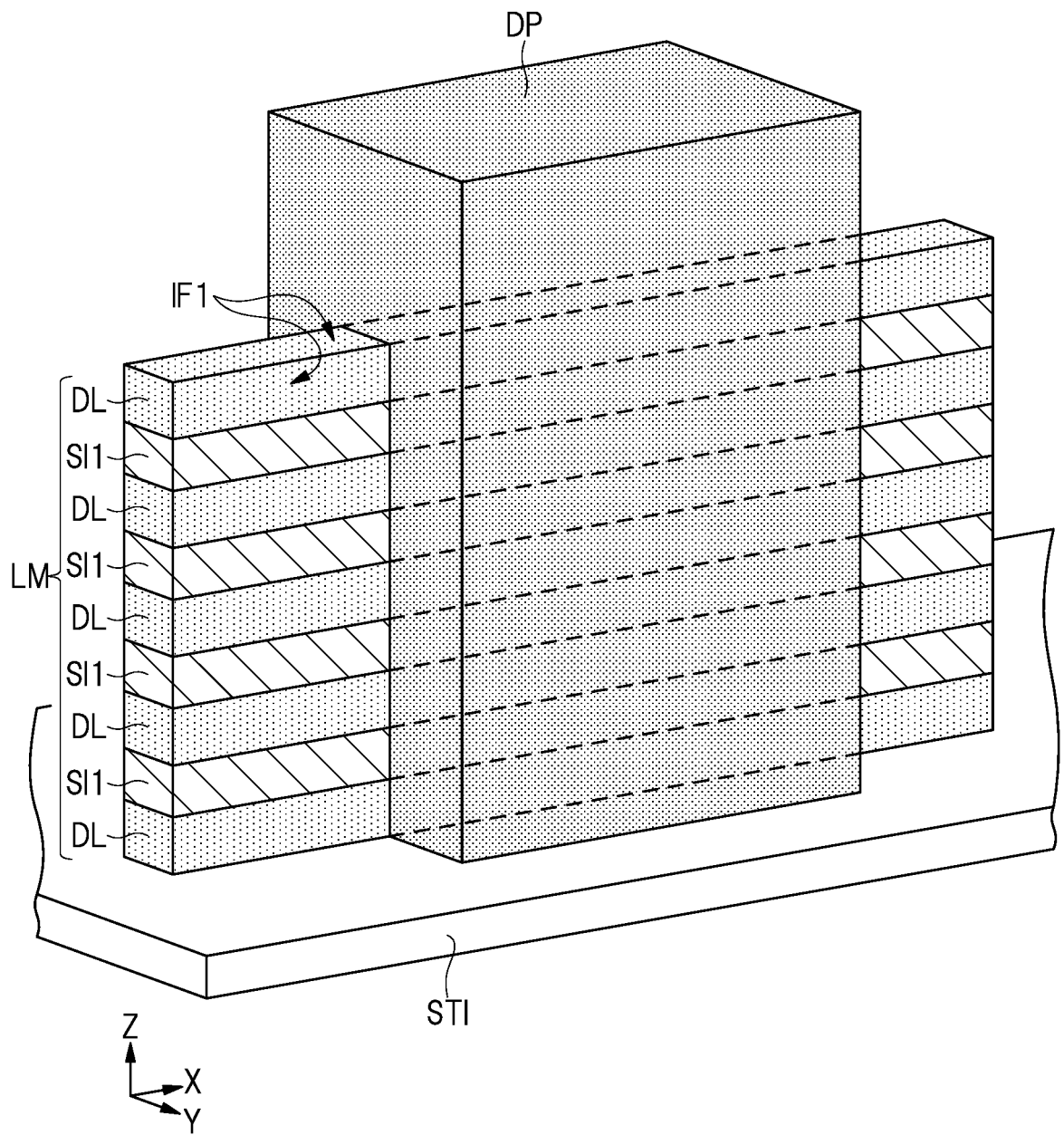
FIG. 7 is a perspective view illustrating a method of manufacturing the semiconductor device according to the first embodiment.

First, as illustrated in FIG. 7, dummy layers DL extending in the X direction and the semiconductor layers SI1 extending in the X direction are alternately stacked in the Z direction to form a stacked body LM including the plurality of dummy layers DL and the plurality of semiconductor layers SI1.

Specifically, first, the dummy layer DL and the semiconductor layer SI1 are alternately stacked on the semiconductor substrate SUB by an epitaxial growth method. The semiconductor layer SI1 is made of, for example, silicon, and the dummy layer DL is made of, for example, a semiconductor material such as silicon germanium different from that of the semiconductor layer SI1. The thickness of the semiconductor layer SI1 is, for example, 5 to 30 nm, and the thickness of the dummy layer DL is, for example, 10 to 30 nm.

Next, a stacked film including a silicon nitride film and a silicon oxide film is formed on the uppermost dummy layer DL by, for example, a chemical vapor deposition (CVD) method. Next, a mask layer is formed by patterning the stacked film. Next, dry etching processing is performed using the mask layer as an etching mask to pattern the stacked body LM and further form a trench in the semiconductor substrate SUB. Next, a silicon oxide film is embedded in the trench by, for example, the CVD method.

Next, the silicon oxide film is polished by, for example, a chemical mechanical polishing (CMP) method to expose the uppermost dummy layer DL of the stacked body LM. Next, the silicon oxide film is retracted by, for example, wet etching processing or dry etching processing using hydrofluoric acid to expose the side surfaces of the stacked body LM (side surfaces of the plurality of dummy layers DL and side surfaces of the plurality of semiconductor layers SI1). As a result, the element isolation portion STI made of the trench and the silicon oxide film is formed in the semiconductor substrate SUB.

Next, an insulating film IF1 made of, for example, a silicon oxide film is formed on the side surfaces of the stacked body LM and the upper surface of the uppermost dummy layer DL of the stacked body LM by, for example, thermal oxidation treatment. The thickness of the insulating film IF1 is, for example, 1 to 3 nm.

Next, a conductive film such as a polycrystalline silicon film is formed by, for example, the CVD method so as to cover the stacked body LM. The thickness of the conductive film is, for example, 100 nm. Next, although not illustrated, the conductive film is patterned so that the conductive film is divided between the memory cells MC adjacent in the Y direction. Next, an insulating film such as a silicon nitride film is embedded between the conductive films adjacent in the Y direction. Next, a part of the conductive film is patterned in the X direction to form a dummy pattern DP covering a part of the stacked body LM. In the following description, illustration of the element isolation portion STI is omitted for simplification.

Figure 8:
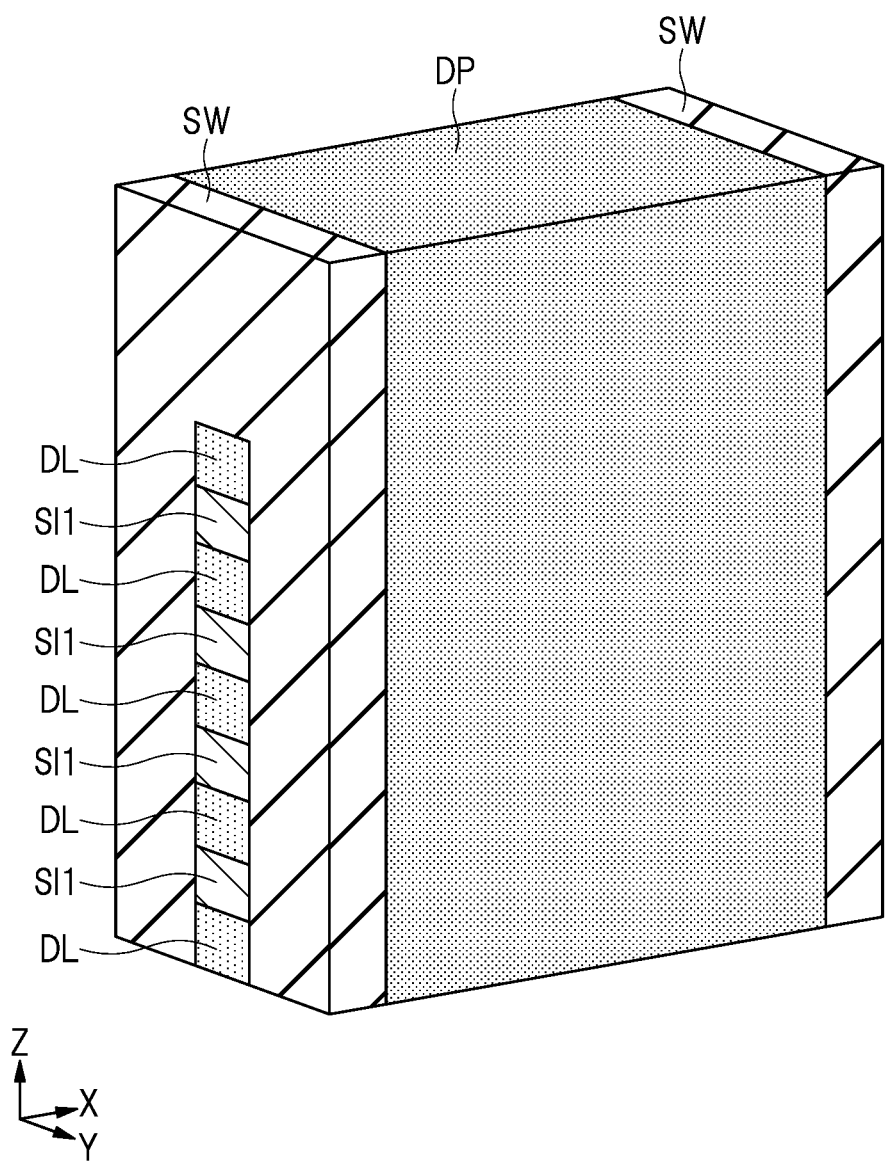
FIG. 8 is a perspective view illustrating the method of manufacturing the semiconductor device, continued from FIG. 7.

Next, as illustrated in FIG. 8, an insulating film is formed by, for example, the CVD method so as to cover the stacked body LM and the dummy pattern DP. The insulating film is made of a silicon nitride film or a stacked film of the silicon nitride film and a silicon oxide film. Next, anisotropic dry etching processing is performed on the insulating film to form the pair of sidewall spacers SW so as to sandwich the dummy pattern DP in the X direction. The pair of sidewall spacers SW is formed so as to cover a part of the stacked body LM exposed from the dummy pattern DP.

Next, the plurality of dummy layers DL and the plurality of semiconductor layers SI1 exposed from the dummy pattern DP and the pair of sidewall spacers SW are removed. Then, although not illustrated in detail, isotropic etching processing is performed on the plurality of semiconductor layers SI1 to retract the end of each of the plurality of semiconductor layers SI1.

Figure 9:
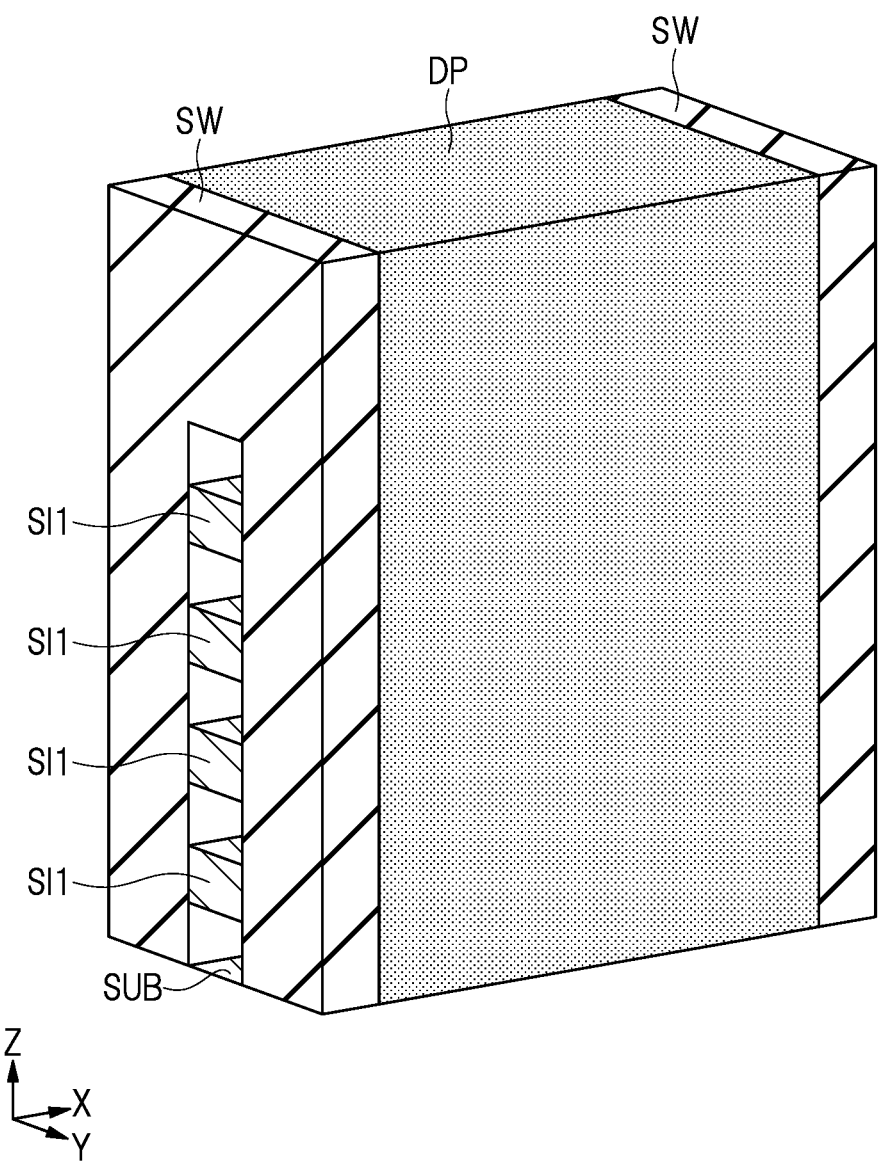
FIG. 9 is a perspective view illustrating the method of manufacturing the semiconductor device, continued from FIG. 8.
Figure 10:
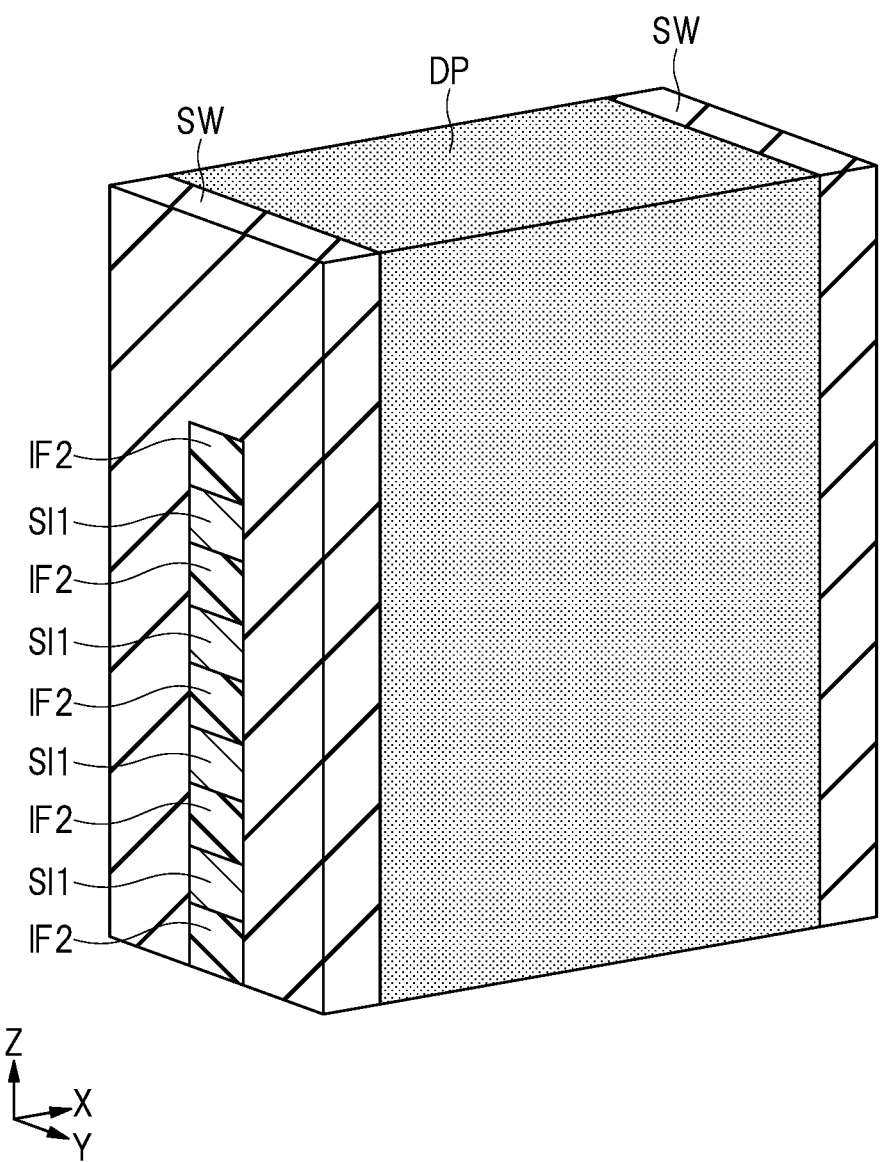
FIG. 10 is a perspective view illustrating the method of manufacturing the semiconductor device, continued from FIG. 9.

Next, as illustrated in FIG. 9, isotropic etching processing is performed on the plurality of dummy layers DL to remove the plurality of dummy layers DL. Next, as illustrated in FIG. 10, by, for example, an atomic layer deposition (ALD) method, insulating films IF2 such as silicon oxide films are embedded in the space where the plurality of dummy layers DL were present. At this time, since the insulating films IF2 are formed in a space other than the space where the plurality of dummy layers DL were present, anisotropic etching is performed to remove such insulating films IF2.

Here, the stacked body LM is formed by alternately stacking the dummy layers DL and the semiconductor layers SI1 by the epitaxial growth method. However, the state of FIG. 10 may also be formed by alternately stacking the insulating films IF2 and the semiconductor layers SI1 from the beginning. In that case, it is conceivable to use a polycrystalline silicon layer formed by the CVD method as the semiconductor layer SI1. However, the semiconductor layer SI1 is used as a channel region. Since the polycrystalline silicon layer has more crystal defects than the epitaxial layer, the channel mobility is lowered. Therefore, it is effective to form the dummy layers DL and the semiconductor layers SI1 by the epitaxial growth method as in the first embodiment.

Figure 11:
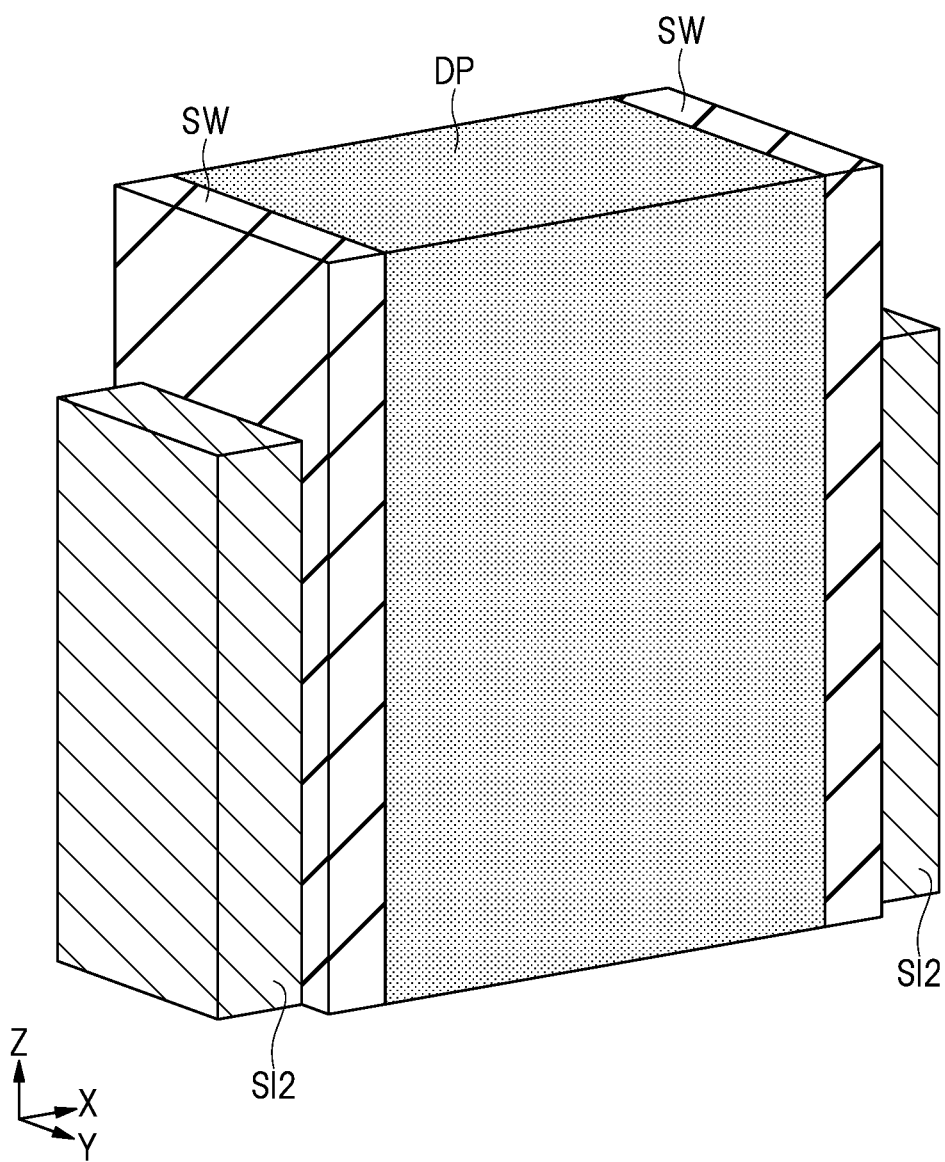
FIG. 11 is a perspective view illustrating the method of manufacturing the semiconductor device, continued from FIG. 10.

Next, as illustrated in FIG. 11, the pair of semiconductor layers SI2 connected to the plurality of semiconductor layers SI1 is formed so as to sandwich the plurality of semiconductor layers SI1 and the pair of sidewall spacers SW in the X direction. The pair of semiconductor layers SI2 is formed as a silicon layer containing an impurity by, for example, the epitaxial growth method. The impurity is the one such as phosphorus (P) exhibiting n-type conductivity. In addition, in order to from such a pair of semiconductor layers SI2, for example, a main gas such as monosilane ($SiH_4$), disilane ($Si_3HO$), dichlorosilane ($SiH_2Cl_2$), or trichlorosilane ($SiHCl_3$) and an additive gas such as phosphine ($PH_3$) are used. After the pair of semiconductor layers SI2 is formed, an impurity such as arsenic (As) may be selectively implanted into the pair of semiconductor layers SI2 using a resist pattern or the like.

Here, as described with reference to FIG. 8, the end of each of the plurality of semiconductor layers SI1 is retracted. In FIG. 11, the pair of semiconductor layers SI2 is grown while using the silicon at its end as a nucleus. Here, since the semiconductor layer SI2 grows while containing the impurity such as phosphorus (P), the lattice spacing of the semiconductor layer SI2 is different from the lattice spacing of the semiconductor layer SI1. Therefore, in the semiconductor layer SI1, tensile stress is generated from the pair of semiconductor layers SI2. This tensile stress improves the mobility of electrons flowing in the channel region.

Figure 12:
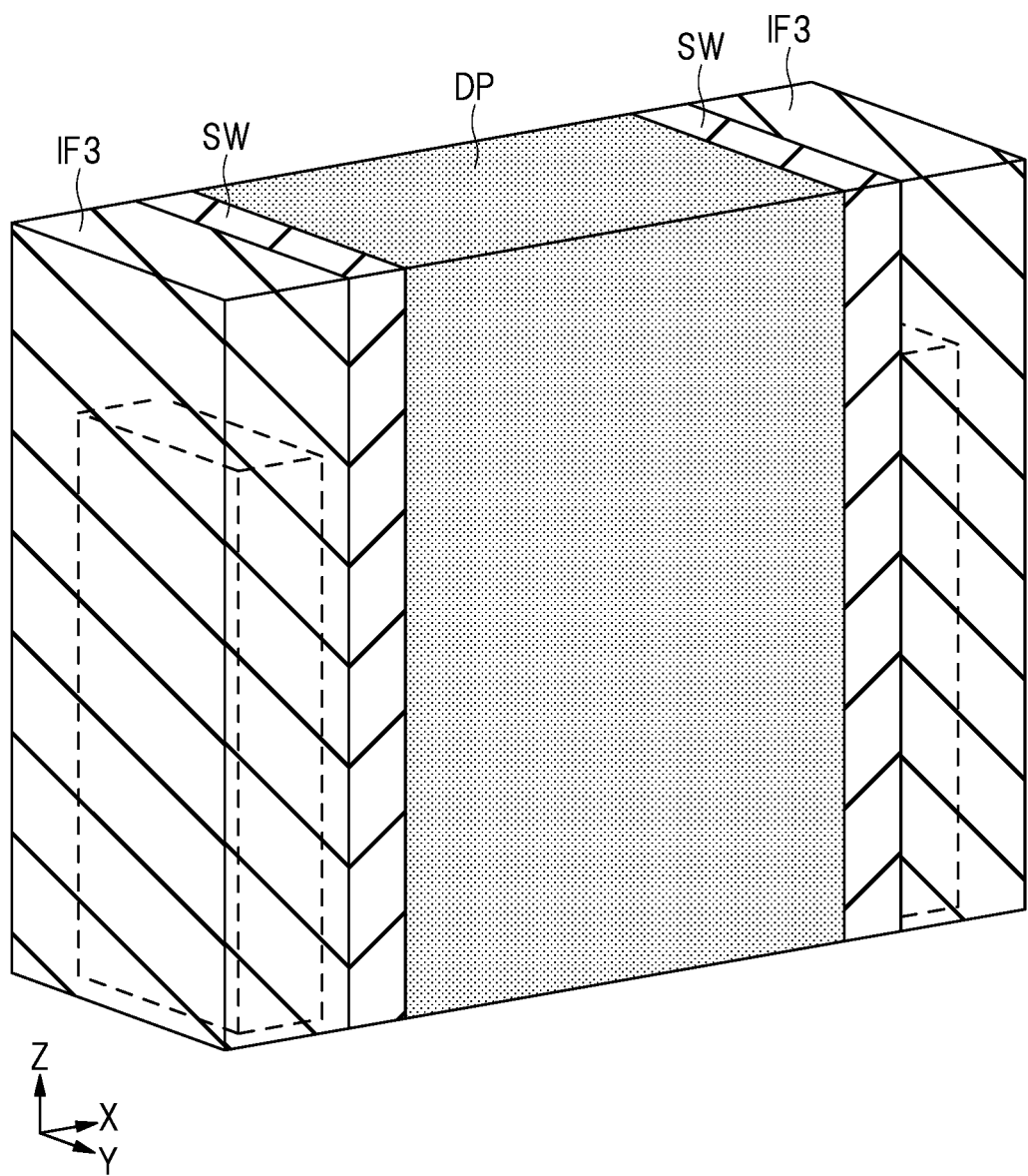
FIG. 12 is a perspective view illustrating the method of manufacturing the semiconductor device, continued from FIG. 11.

Next, as illustrated in FIG. 12, an insulating film IF3 such as a silicon oxide film is formed by, for example, the CVD method so as to cover the dummy pattern DP, the sidewall spacer SW, and the pair of semiconductor layers SI2. Next, the insulating film IF3 is polished by the CMP method to expose the dummy pattern DP and the sidewall spacer SW.

Figure 13:
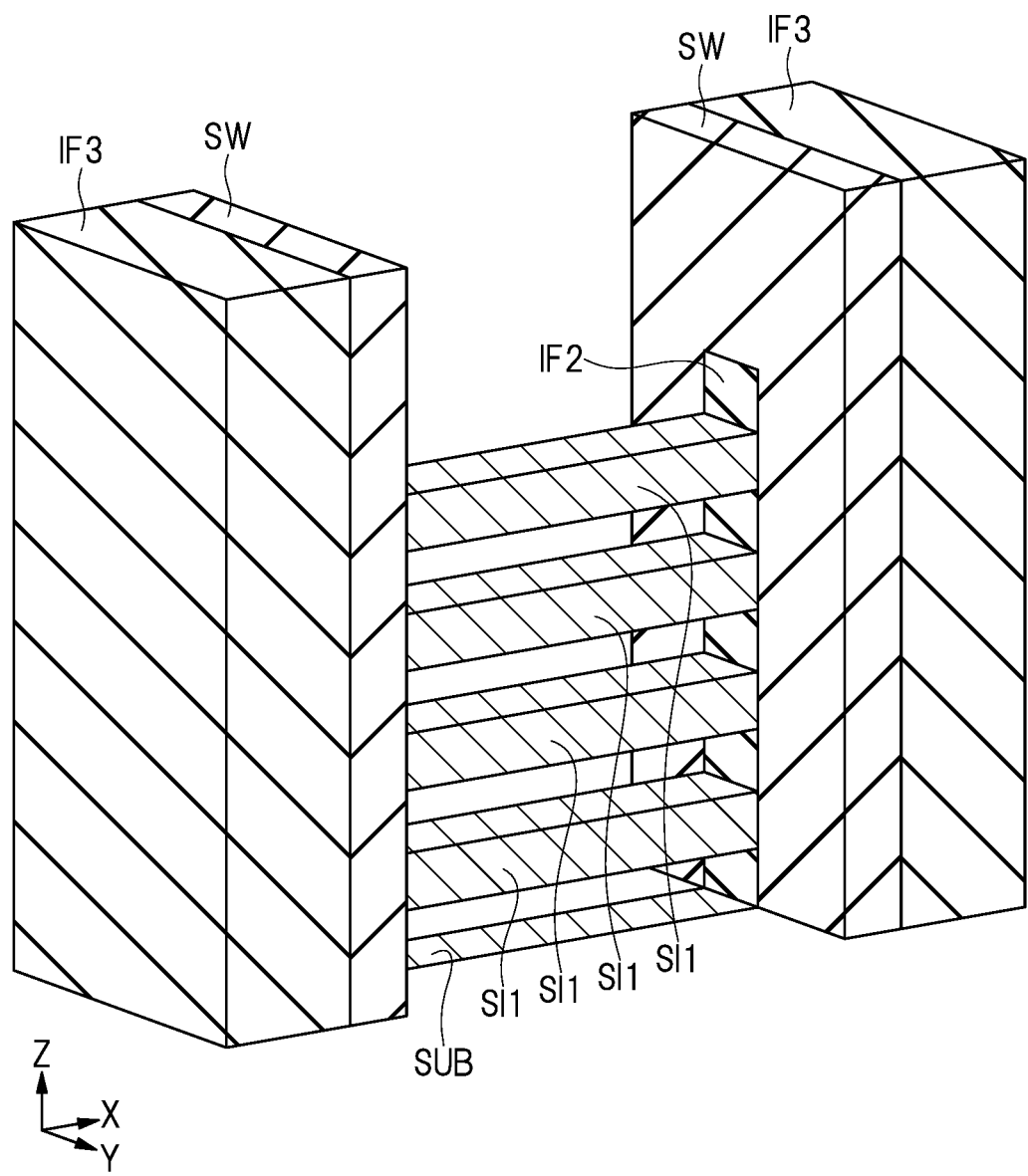
FIG. 13 is a perspective view illustrating the method of manufacturing the semiconductor device, continued from FIG. 12.

Next, between the pair of sidewall spacers SW as illustrated in FIG. 13, the dummy pattern DP and the plurality of insulating films IF2 covered with the dummy pattern DP are removed by wet etching processing. In addition, the plurality of insulating films IF1 formed on the side surfaces of the plurality of semiconductor layers SI1 are also removed together with the plurality of insulating films IF2. As a result, the plurality of semiconductor layers SI1 are exposed between the pair of sidewall spacers SW. The corners of the plurality of semiconductor layers SI1 may be rounded in a hydrogen atmosphere by a heat treatment on the plurality of semiconductor layers SI1 exposed.

Figure 14:
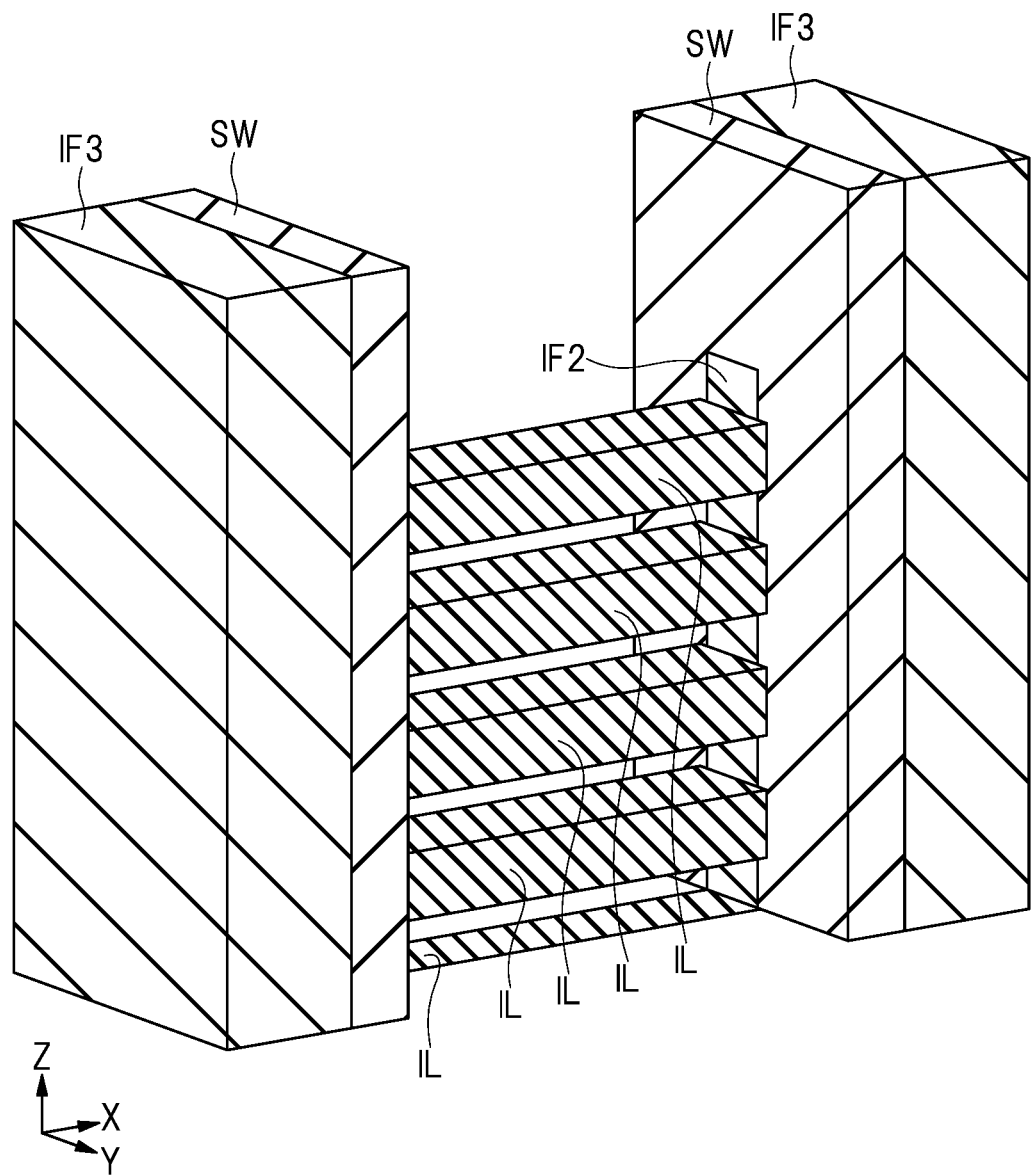
FIG. 14 is a perspective view illustrating the method of manufacturing the semiconductor device, continued from FIG. 13.

Next, as illustrated in FIG. 14, a plurality of paraelectric films IL are formed on the outer peripheries of the plurality of semiconductor layers SI1. In other words, the plurality of paraelectric films IL are formed on the upper surface, the lower surface, and both side surfaces of the plurality of semiconductor layers SI1. The paraelectric film IL can be formed by, for example, an ISSG oxidation method or the ALD method. Here, the area of the plurality of paraelectric films IL is the contact area between the plurality of paraelectric films IL and the bottom electrode BE as described in FIG. 5.

Figure 15:
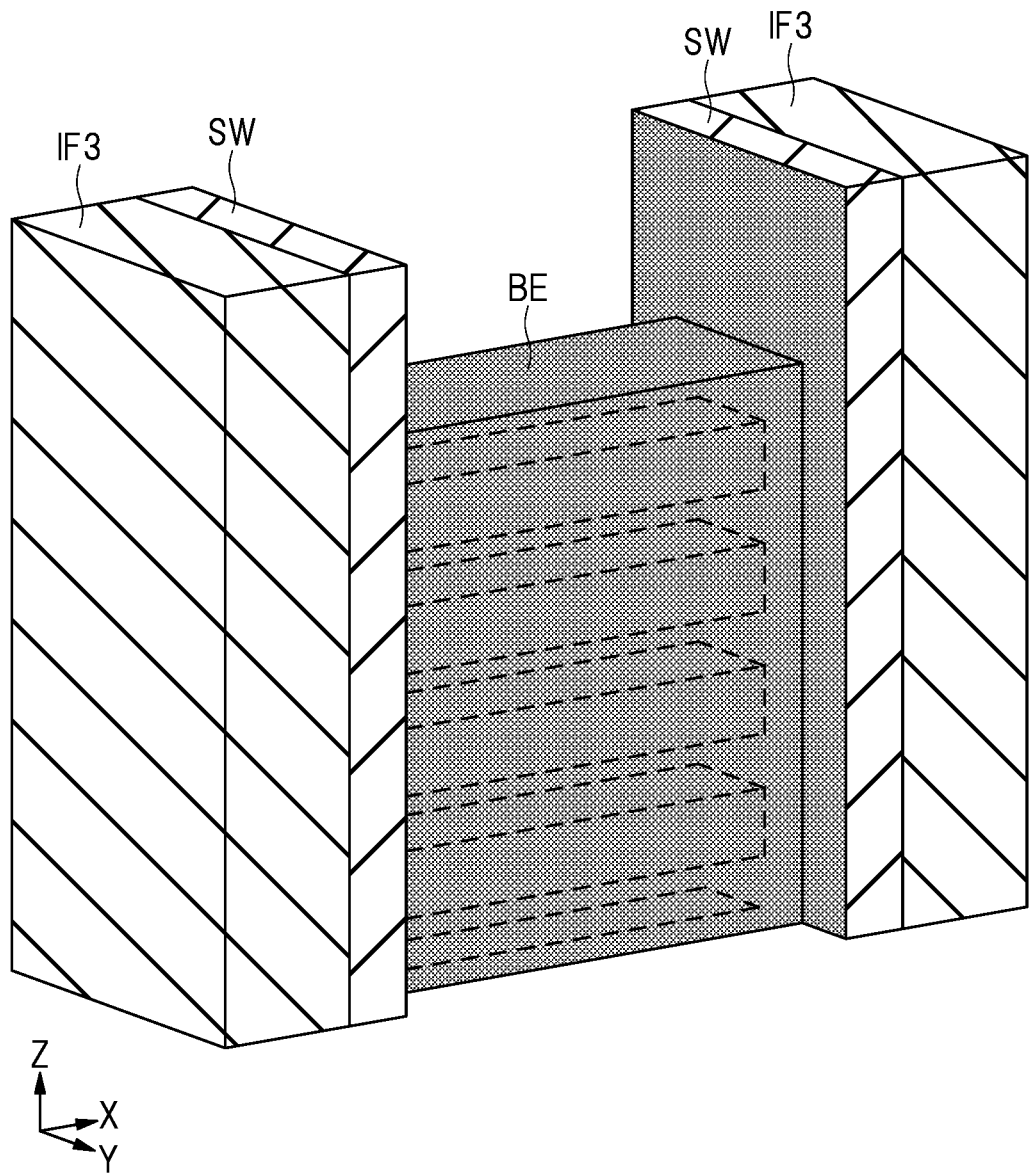
FIG. 15 is a perspective view illustrating the method of manufacturing the semiconductor device, continued from FIG. 14.

Next, as illustrated in FIG. 15, the bottom electrode BE is formed on the outer peripheries of the plurality of paraelectric films IL. The bottom electrode BE is formed as follows: First, a titanium nitride film is formed by, for example, the CVD method so as to cover the plurality of paraelectric films IL. Next, the titanium nitride film is patterned to leave the titanium nitride film as the bottom electrode BE between the pair of sidewall spacers SW. At this time, a part of the bottom electrode BE may be not completely removed and be left on the side surfaces of the pair of sidewall spacers SW. In this state, two paraelectric films IL and the bottom electrode BE are provided between two adjacent semiconductor layers SI1 in the Z direction.

Figure 16:
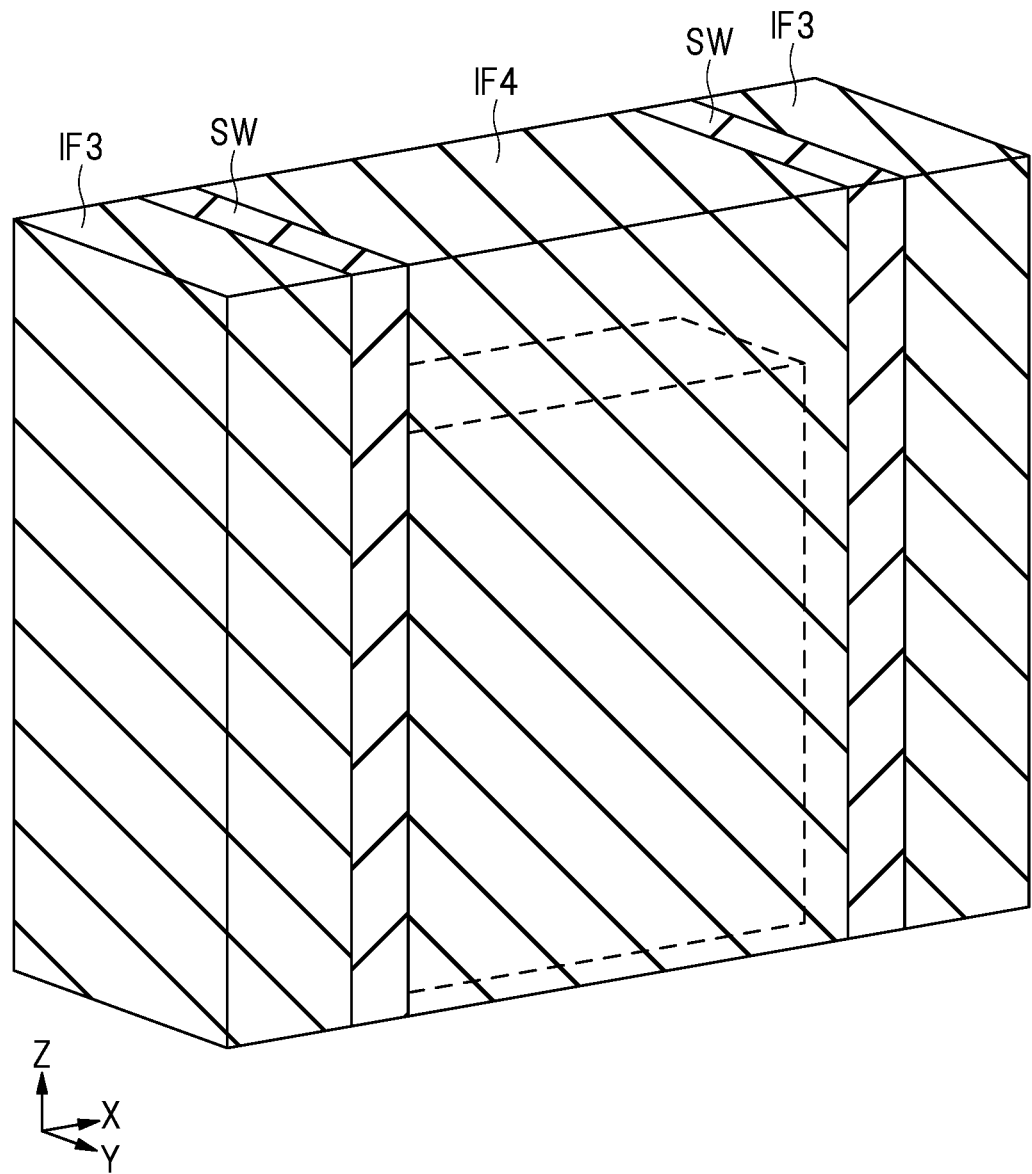
FIG. 16 is a perspective view illustrating the method of manufacturing the semiconductor device, continued from FIG. 15.

Next, as illustrated in FIG. 16, an insulating film IF4 such as a silicon oxide film is formed by, for example, the CVD method so as to cover the bottom electrode BE. Next, the insulating film IF4 is polished by the CMP method to expose the sidewall spacer SW and the insulating film IF3. Then, isotropic etching processing may be performed on a part of the bottom electrode BE left on the side surfaces of the pair of sidewall spacers SW to retract the bottom electrode BE.

Figure 17:
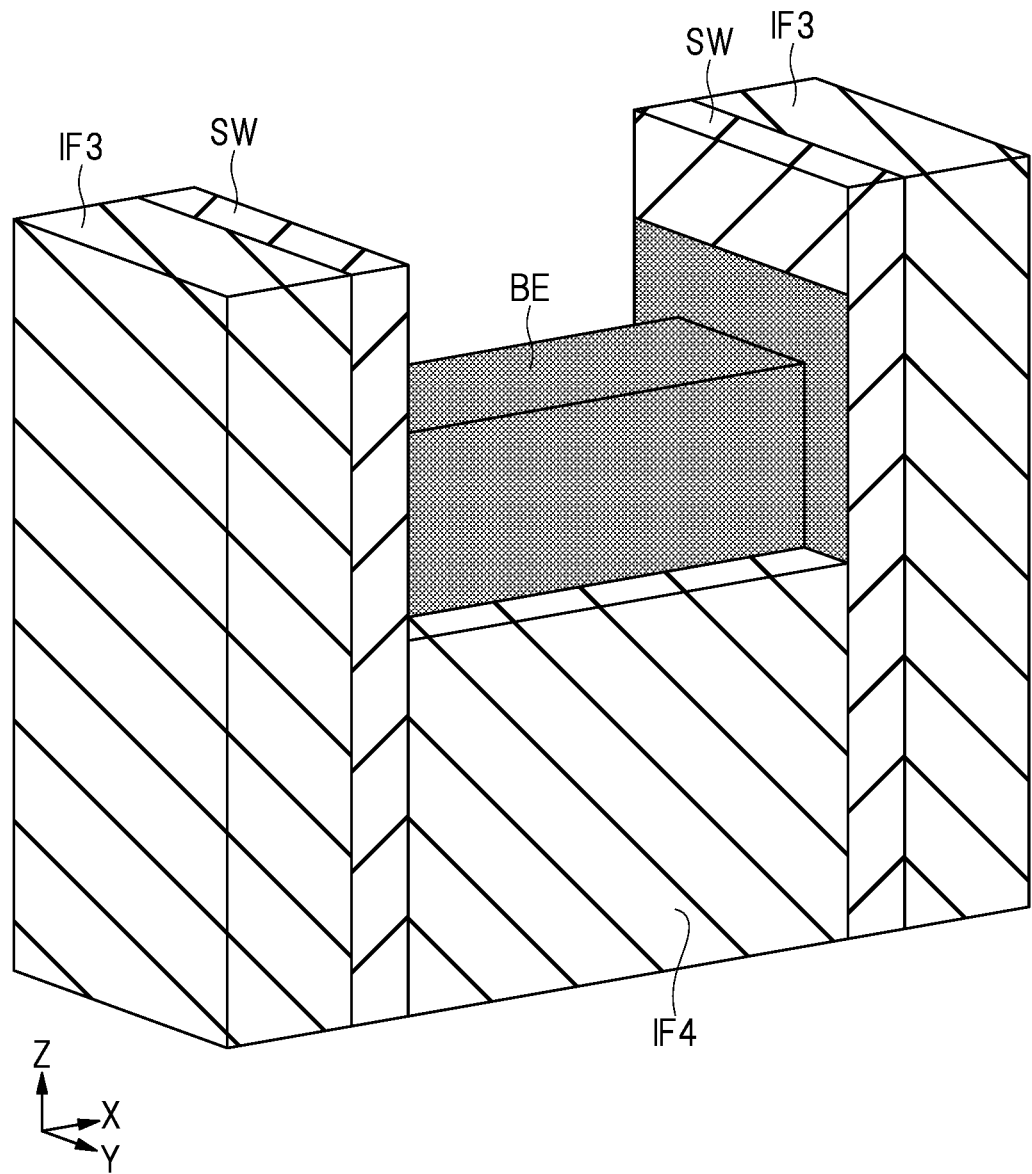
FIG. 17 is a perspective view illustrating the method of manufacturing the semiconductor device, continued from FIG. 16.

Next, as illustrated in FIG. 17, anisotropic etching processing is performed on the insulating film IF4 to retract the insulating film IF4. As a result, the position of the upper surface of the insulating film IF4 becomes lower than the position of the upper surface of the bottom electrode BE, and the upper portion of the bottom electrode BE is exposed. Here, the exposed area of the bottom electrode BE is the contact area between the ferroelectric film FE and the bottom electrode BE as described in FIG. 6.

Figure 18:
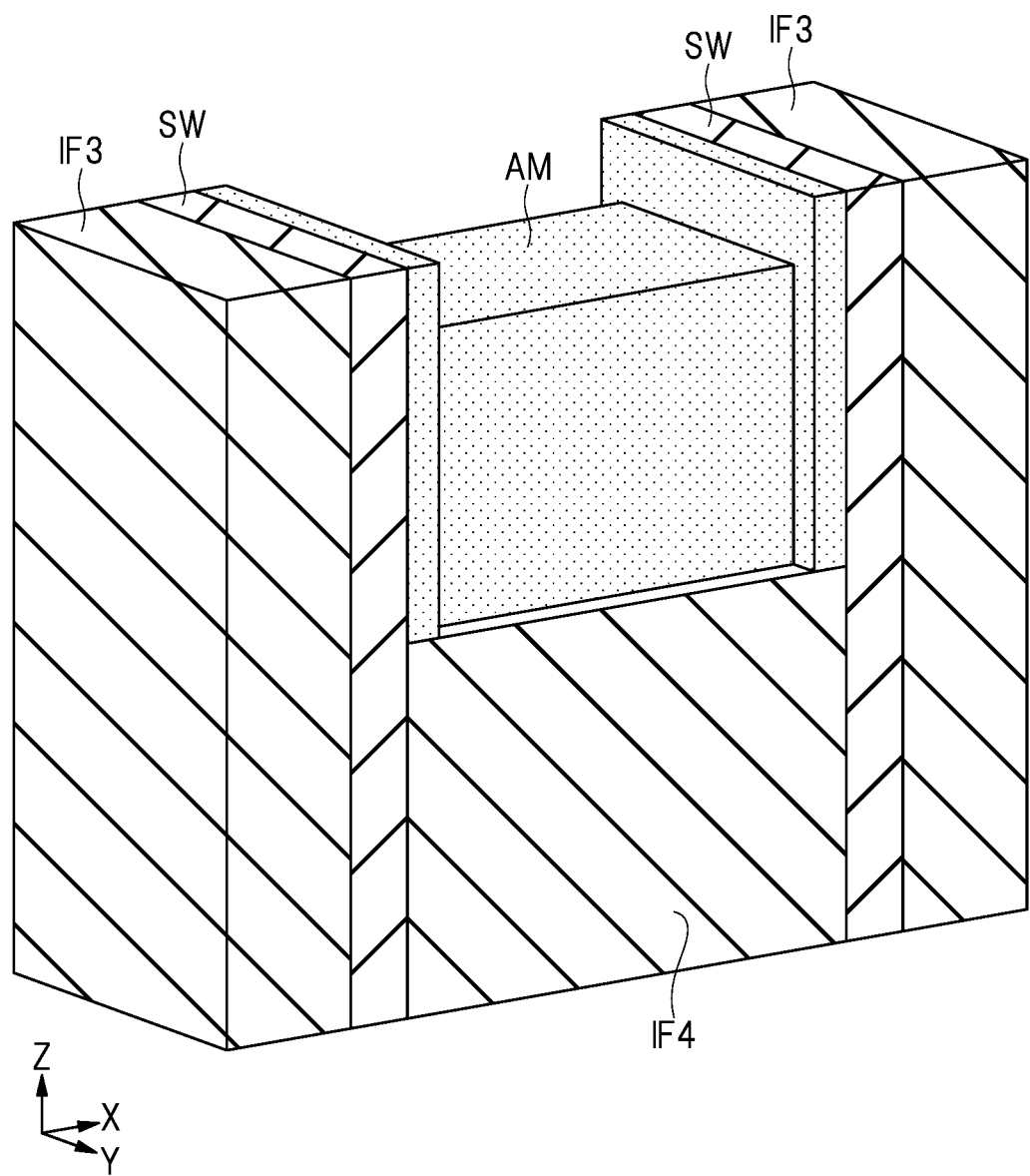
FIG. 18 is a perspective view illustrating the method of manufacturing the semiconductor device, continued from FIG. 17.

Next, as illustrated in FIG. 18, an amorphous film AM is formed on the bottom electrode BE. The amorphous film AM is formed by, for example, the ALD method so as to cover the bottom electrode BE. At this time, a part of the amorphous film AM is also formed on the side surfaces and the upper surface of the pair of sidewall spacers SW and the upper surface of the insulating film IF3. The bottom electrode BE formed on the side surfaces of the pair of sidewall spacers SW is covered with the part of the amorphous film AM.

Figure 19:
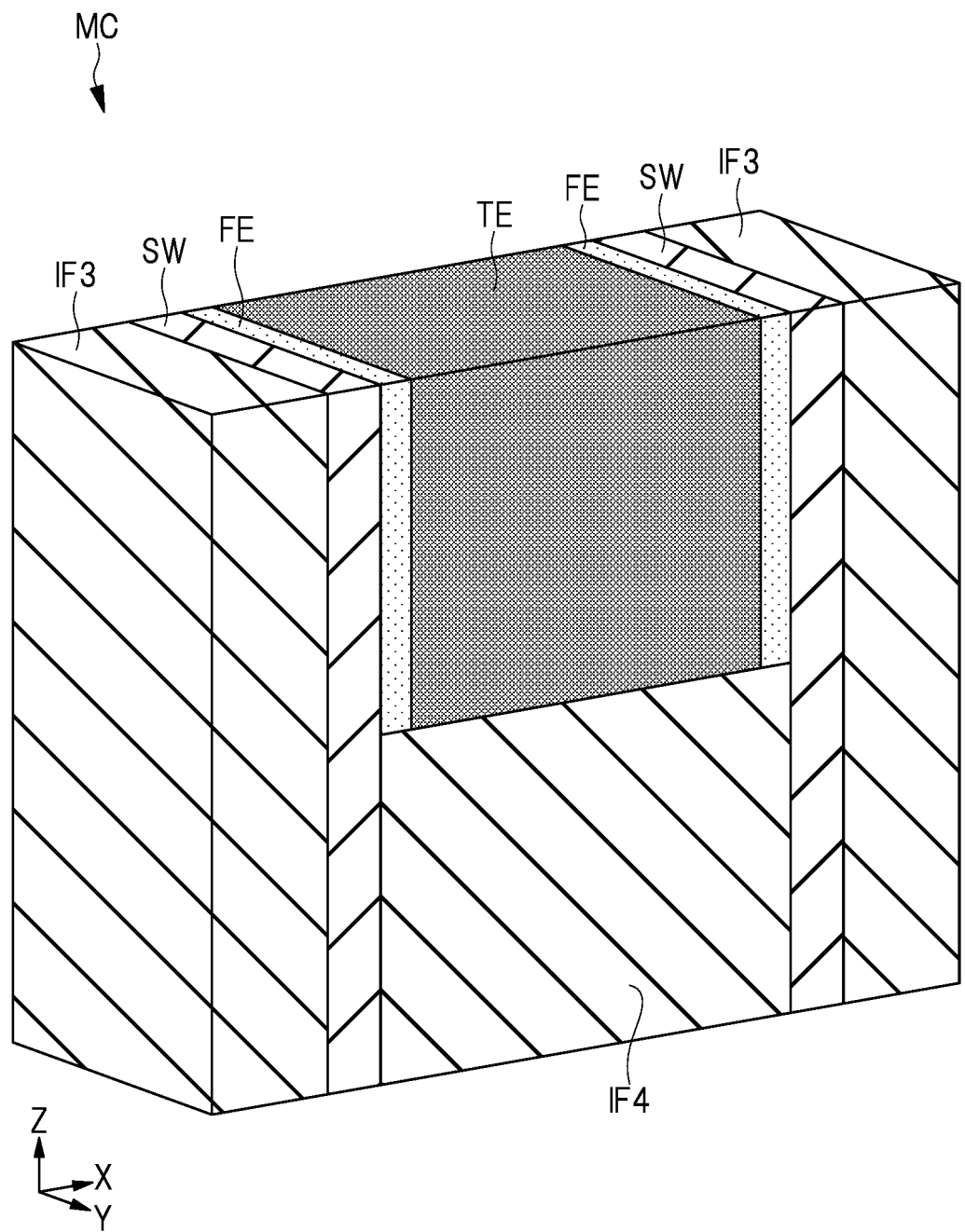
FIG. 19 is a perspective view illustrating the method of manufacturing the semiconductor device, continued from FIG. 18.

Next, as illustrated in FIG. 19, the top electrode TE is formed on the amorphous film AM. The top electrode TE is formed as follows: First, a titanium nitride film is formed by, for example, the CVD method so as to cover the amorphous film AM and the sidewall spacer SW. Next, the titanium nitride film and the amorphous film AM formed on the upper surfaces of the pair of sidewall spacers SW and the upper surface of the insulating film IF3 are polished by the CMP method. As a result, the sidewall spacer SW, the insulating film IF3, and the amorphous film AM formed on the side surfaces of the sidewall spacer SW are exposed.

Next, the amorphous film AM is subjected to a heat treatment at 600 to 800° C. to form the ferroelectric film FE serving as an insulating film having ferroelectricity. Thus, the memory cell MC is manufactured. Before this heat treatment, the amorphous film AM is not exposed to plasma. In addition, the heat treatment is performed in a state where the ferroelectric film FE is covered with the top electrode TE. Therefore, since the ferroelectric film FE can be formed without being exposed to plasma during the manufacturing process of the first embodiment, the reliability of the memory cell MC can be ensured.

Then, the semiconductor device illustrated in FIGS. 1 to 4 is manufactured through the following manufacturing process. First, an interlayer insulating film (not illustrated) is formed by, for example, the CVD method so as to cover the memory cell MC. Next, a plurality of contact holes are formed in the interlayer insulating film. Next, a stacked film of a barrier metal film such as a titanium nitride film and a tungsten film is embedded in the plurality of contact holes to form a plurality of conductive layers (plugs).

For example, the conductive layer PG1 used for applying the gate voltage to the top electrode TE is formed on the top electrode TE. In addition, the conductive layer PG2 used for applying the source voltage or the drain voltage to the pair of semiconductor layers SI2 is formed on each of the pair of semiconductor layers SI2.

Second Embodiment

A semiconductor device according to a second embodiment will be described below with reference to FIGS. 20 and 21. In the following description, differences from the first embodiment will be mainly described, and description of points overlapping with the first embodiment will be omitted.

In the first embodiment, the bottom electrode BE is not electrically connected to the conductive layers PG1 and PG2, and is in the floating state during the write operation, the erase operation, and the read operation for the memory cell MC.

Figure 20:
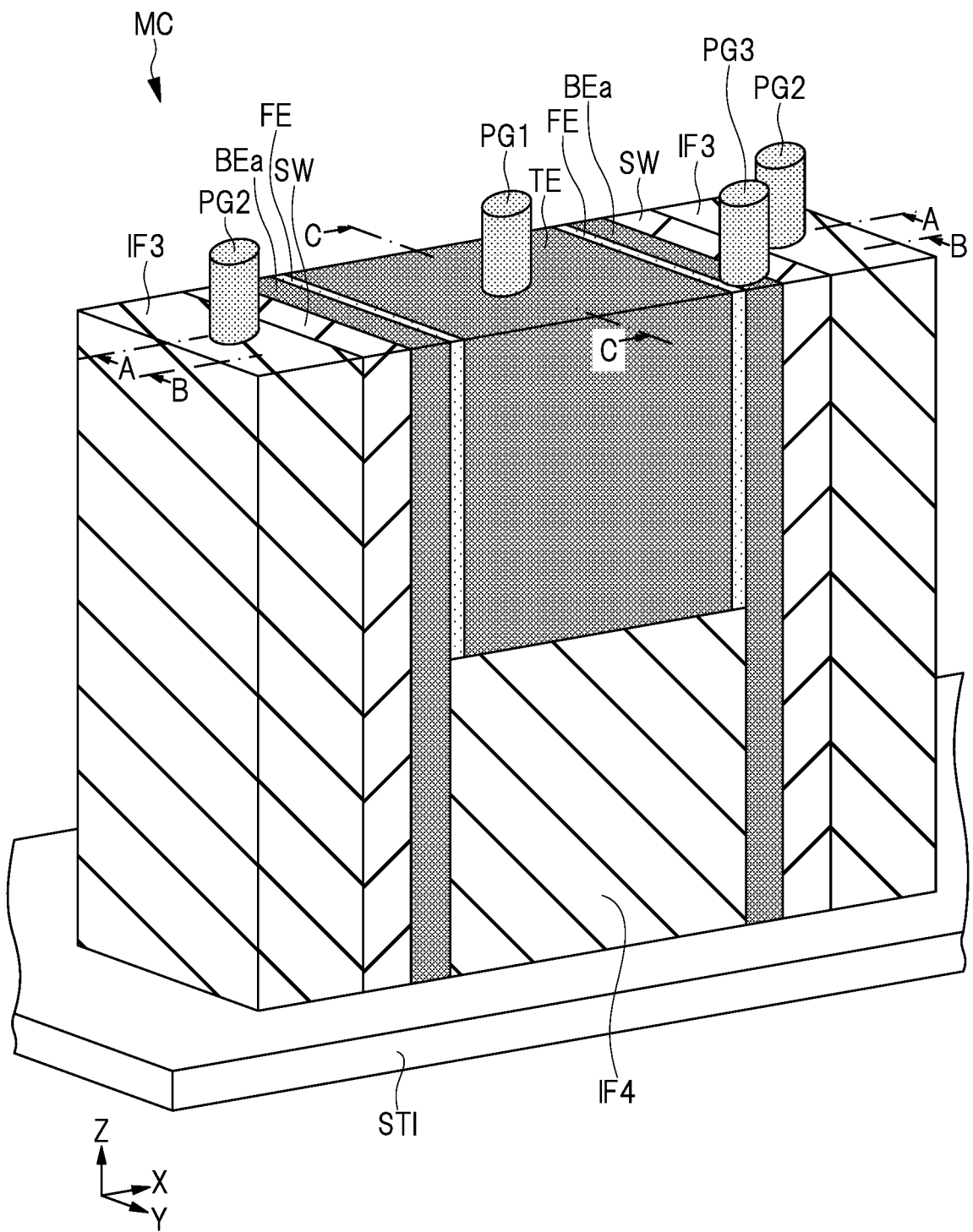
FIG. 20 is a perspective view illustrating a semiconductor device including a memory cell according to a second embodiment.
Figure 21:
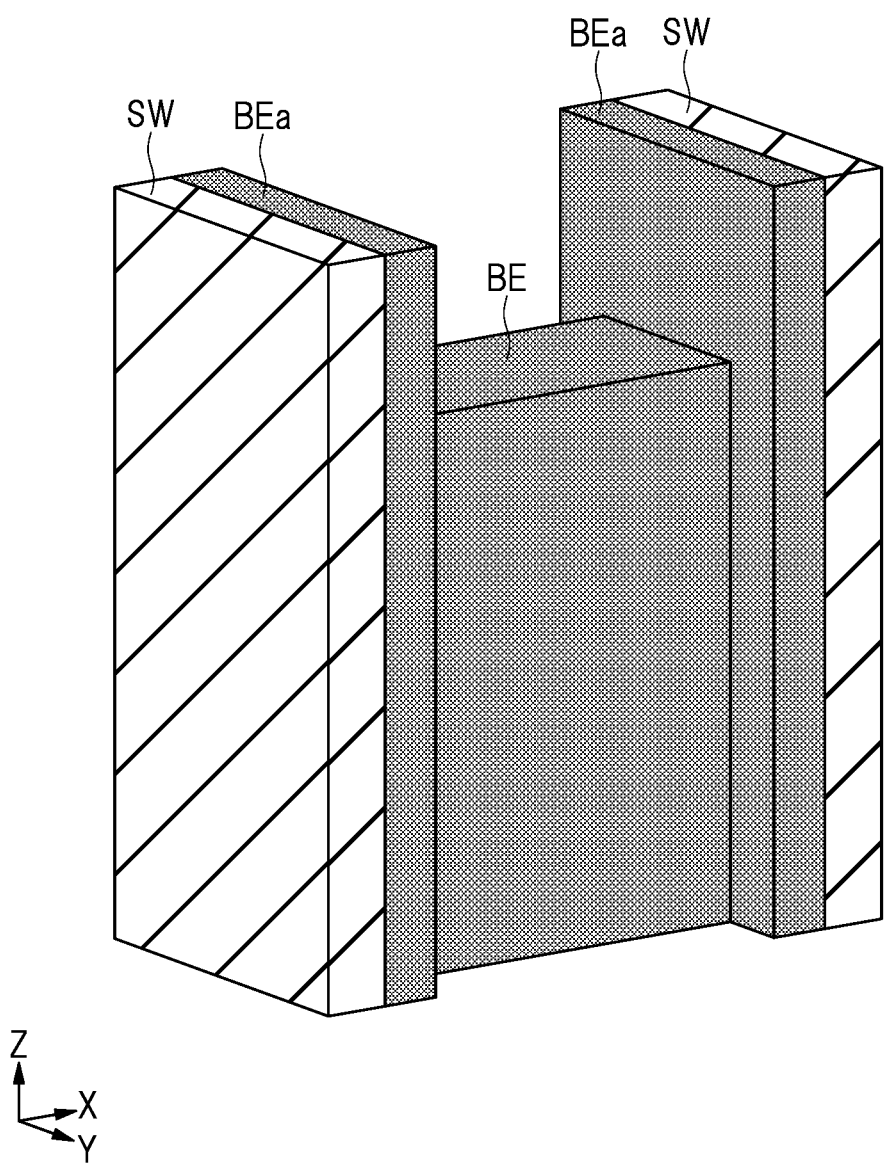
FIG. 21 is a perspective view illustrating a method of manufacturing the semiconductor device according to the second embodiment.
Figure 22:
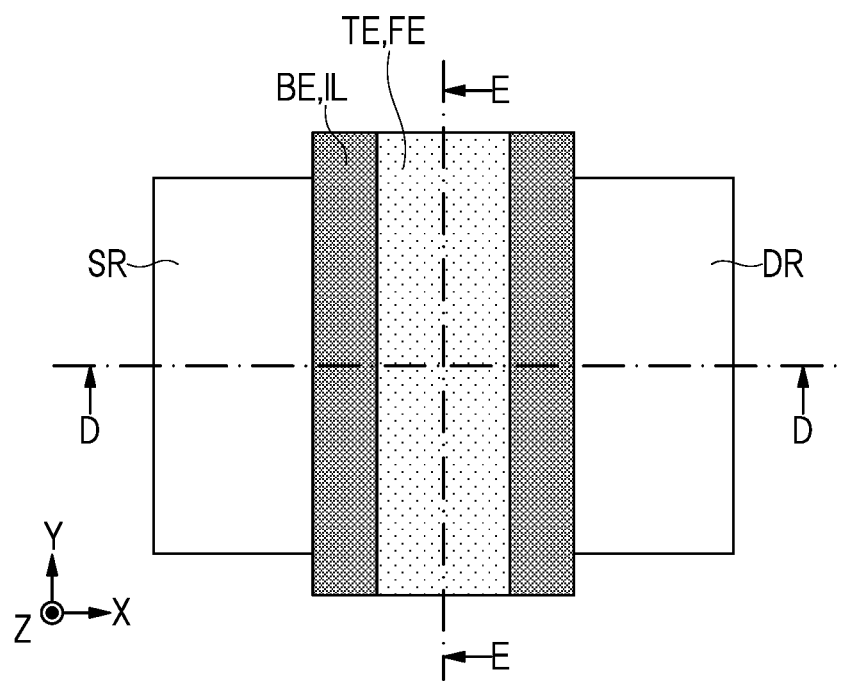
FIG. 22 is a plan view illustrating a memory cell in a study example.
Figure 23:
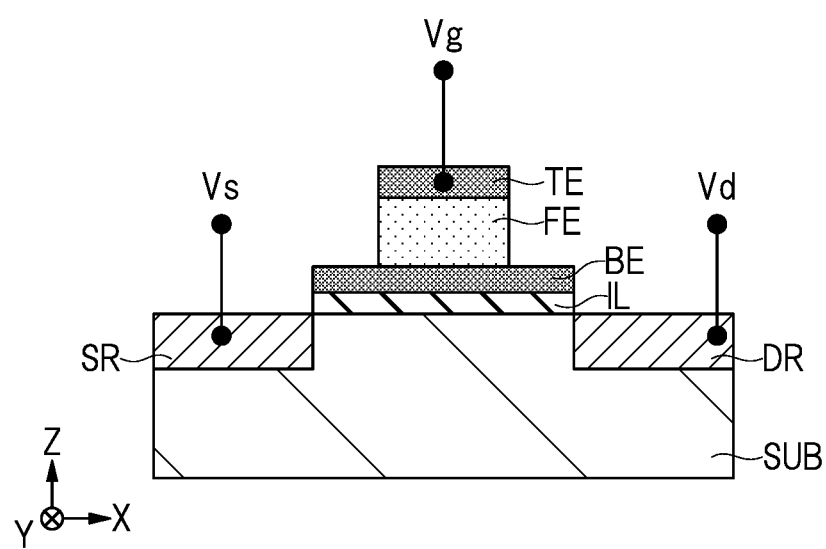
FIG. 23 is a cross-sectional view illustrating the memory cell in the study example.
Figure 24:
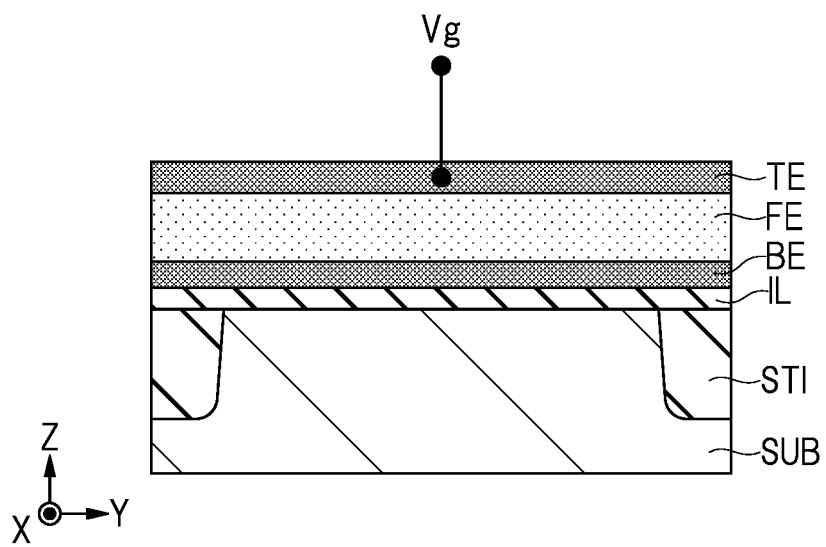
FIG. 24 is a cross-sectional view illustrating the memory cell in the study example.

As illustrated in FIG. 20, in the second embodiment, a part of the bottom electrode BE serving as a lead-out portion BEa is also formed on the side surfaces of each of the pair of sidewall spacers SW. The bottom electrode BE is electrically connected to the conductive layer (plug) PG3 via the lead-out portion BEa. During the write operation and the erase operation for the memory cell MC, the gate voltage is applied from the conductive layer PG1 to the top electrode TE, and a voltage different from the gate voltage is applied from the conductive layer PG3 to the bottom electrode BE.

The values of the source voltage and the drain voltage during the write operation, the erase operation, and the read operation in the second embodiment are the same as those in the first embodiment.

In the write operation, a negative gate voltage is applied to the top electrode TE, and a positive voltage is applied to the bottom electrode BE. For example, a gate voltage of −3 V is applied to the top electrode TE, and 3 V is applied to the bottom electrode BE. In the erase operation, a positive gate voltage is applied to the top electrode TE, and a negative voltage is applied to the bottom electrode BE. For example, a gate voltage of 3 V is applied to the top electrode TE, and −3 V is applied to the bottom electrode BE. In the read operation, a gate voltage having a predetermined value is applied to the top electrode TE, and the same voltage as the gate voltage is applied to the bottom electrode BE. For example, a gate voltage of 0 V is applied to the top electrode TE, and 0 V is applied to the bottom electrode BE.

As described above, also in the second embodiment, the write operation, the erase operation, and the read operation for the memory cell MC can be performed. In the second embodiment, the voltages applied to the top electrode TE and the bottom electrode BE can be independently controlled, and therefore, controllability on the memory cell MC can be improved. That is, since the division of the gate voltage Vg into the gate voltage Vg_IL in the paraelectric film IL can be reduced, a higher voltage can be applied to the ferroelectric film FE.

Note that the lead-out portion BEa can be formed as follows: As illustrated in FIG. 21, when the titanium nitride film is patterned in FIG. 15, the titanium nitride film is left on the side surfaces of each of the pair of sidewall spacers. In addition, the step of retracting the bottom electrode BE performed in FIG. 16 is not performed in the second embodiment. As a result, a part of the bottom electrode BE serving as the lead-out portion BEa is also formed on the side surfaces of each of the pair of sidewall spacers SW.

Then, after the step of forming the ferroelectric film FE and the top electrode TE, the conductive layer PG3 used for applying the voltage different from the gate voltage to the bottom electrode BE is formed on the lead-out portion BEa by the same method as the step of forming the conductive layers PG1 and PG2. As a result, the conductive layer PG3 and the bottom electrode BE are electrically connected.

In the foregoing, the present invention has been concretely described on the basis of the embodiments. However, the present invention is not limited to the foregoing embodiments, and various modifications can be made within the scope of the present invention.

What is claimed is:

1. A semiconductor device having a nonvolatile memory cell, comprising:
   a plurality of first semiconductor layers each extending in a first direction and each configuring a channel region of the nonvolatile memory cell;
   a pair of second semiconductor layers provided so as to sandwich the plurality of first semiconductor layers in the first direction, connected to the plurality of first semiconductor layers, and configuring a source region and a drain region of the nonvolatile memory cell;
   a plurality of paraelectric films covering outer peripheries of the plurality of first semiconductor layers between the pair of second semiconductor layers, respectively;
   a bottom electrode covering outer peripheries of the plurality of paraelectric films between the pair of second semiconductor layers;
   a ferroelectric film formed on the bottom electrode; and
   a top electrode formed on the ferroelectric film,
   wherein a contact area between the bottom electrode and the ferroelectric film is smaller than a contact area between the bottom electrode and the plurality of paraelectric films.

2. The semiconductor device according to claim 1,
   wherein the plurality of first semiconductor layers are provided adjacent to each other so as to be separated from each other in a second direction intersecting the first direction, and
   wherein the two paraelectric films and the bottom electrode are provided between the two first semiconductor layers adjacent to each other in the second direction.

3. The semiconductor device according to claim 1, wherein, during a write operation and an erase operation for the nonvolatile memory cell, a gate voltage is applied to the top electrode, and the bottom electrode is in a floating state.

4. The semiconductor device according to claim 1, wherein, during a write operation and an erase operation for the nonvolatile memory cell, a gate voltage is applied to the top electrode, and a voltage different from the gate voltage is applied to the bottom electrode.

5. The semiconductor device according to claim 1,
   wherein the paraelectric film is a silicon oxide film, a silicon oxynitride film, or a monoclinic $HfO_2$ film, and
   wherein the ferroelectric film is an orthorhombic $HfO_2$ film or an orthorhombic $HfO_2$ film to which at least one of Zr, Si, N, C, and Al is added.

6. The semiconductor device according to claim 1, wherein each of the plurality of first semiconductor layers and the pair of second semiconductor layers is made of silicon.

7. The semiconductor device according to claim 1, wherein each of the bottom electrode and the top electrode is made of titanium nitride.

8. The semiconductor device according to claim 1,
   wherein the top electrode is formed on an upper surface and a side surface of the ferroelectric film, and
   wherein the semiconductor device comprises a pair of sidewall spacers formed so as to sandwich the ferroelectric film and the top electrode.

9. A method of manufacturing a semiconductor device having a nonvolatile memory cell, comprising the steps of:
   (a) forming a stacked body including a plurality of dummy layers and a plurality of first semiconductor layers by stacking the dummy layers extending in a first direction and the first semiconductor layers extending in the first direction alternately in a second direction intersecting the first direction;
   (b) after the step (a), forming a dummy pattern covering a part of the stacked body;
   (c) after the step (b), forming a pair of sidewall spacers covering a part of the stacked body exposed from the dummy pattern so as to sandwich the dummy pattern in the first direction;
   (d) after the step (c), removing the plurality of dummy layers and the plurality of first semiconductor layers exposed from the dummy pattern and the pair of sidewall spacers;
   (e) after the step (d), removing the plurality of dummy layers;
   (f) after the step (e), embedding a plurality of first insulating films in a space where the plurality of dummy layers were present;
   (g) after the step (f), forming a pair of second semiconductor layers connected to the plurality of first semiconductor layers so as to sandwich the plurality of first semiconductor layers and the pair of sidewall spacers in the first direction;
   (h) after the step (g), exposing the plurality of first semiconductor layers by removing the dummy pattern and the plurality of first insulating films covered with the dummy pattern between the pair of sidewall spacers;

(i) after the step (h), forming a plurality of paraelectric films on outer peripheries of the plurality of first semiconductor layers;

(j) after the step (i), forming a bottom electrode on outer peripheries of the plurality of paraelectric films;

(k) after the step (j), forming an amorphous film on the bottom electrode;

(l) after the step (k), forming a top electrode on the amorphous film; and (m) after the step (l), forming a ferroelectric film by subjecting the amorphous film to a heat treatment, wherein each of the plurality of first semiconductor layers configures a channel region of the nonvolatile memory cell, and wherein the pair of second semiconductor layers configure a source region and a drain region of the nonvolatile memory cell.

10. The method of according to claim 9,
wherein the dummy layer is made of a semiconductor material different from a material of the first semiconductor layer, and,
wherein, in the step (a), each of the dummy layer and the first semiconductor layer is formed by an epitaxial growth method.

11. The method according to claim 9, further comprising the step of:

(n) between the step (d) and the step (e), retreating an end of each of the plurality of first semiconductor layers,
wherein, in the step (g), the pair of second semiconductor layers is formed as a silicon layer containing an impurity by an epitaxial growth method.

12. The method according to claim 11, wherein each of the plurality of first semiconductor layers is made of silicon.

13. The method according to claim 9, wherein, in the step (f), the first insulating film is formed by an ALD method.

14. The method according to claim 9, wherein, after the step (m), a contact area between the bottom electrode and the ferroelectric film is smaller than a contact area between the bottom electrode and the plurality of paraelectric films.

15. The method according to claim 9, wherein, after the step (j), the two paraelectric films and the bottom electrode are provided between the two first semiconductor layers adjacent to each other in the second direction.

16. The method according to claim 9, further comprising the steps of:

(o) after the step (m), on the top electrode, forming a first conductive layer used for applying a gate voltage to the top electrode; and (p) after the step (m), on the pair of second semiconductor layers, forming second conductive layers each for applying a source voltage or a drain voltage to the pair of second semiconductor layers.

17. The method according to claim 16,
wherein, in the step (j), a part of the bottom electrode is also formed as a lead-out portion on side surfaces of each of the pair of sidewall spacers, and
wherein the method further includes a step (q) after the step (m), forming a third conductive layer used for applying a voltage different from the gate voltage to the bottom electrode on the extended portion.

18. The method according to claim 9,
wherein the paraelectric film is a silicon oxide film, a silicon oxynitride film, or a monoclinic $HfO_2$ film, and
wherein the ferroelectric film is an orthorhombic $HfO_2$ film or an orthorhombic $HfO_2$ film to which at least one of Zr, Si, N, C, and Al is added.

19. The method according to claim 9, wherein each of the bottom electrode and the top electrode is made of titanium nitride.

20. The method according to claim 9,
wherein in the (l), the top electrode is formed on an upper surface and a side surface of the amorphous film, and
wherein the heat treatment is performed in a state where the amorphous film is formed between the pair of sidewall spacers and is covered with the top electrode.

* * * * *